(12) United States Patent
Yamane et al.

(10) Patent No.: US 7,894,981 B2
(45) Date of Patent: Feb. 22, 2011

(54) TRAFFIC INFORMATION PROVIDING SYSTEM AND CAR NAVIGATION SYSTEM

(75) Inventors: Kenichiro Yamane, Hitachi (JP); Junsuke Fujiwara, Hitachi (JP); Yoshinori Endo, Mito (JP); Kimiyoshi Machii, Hitachi (JP); Masatoshi Kumagai, Hitachi (JP); Takayoshi Yokota, Hitachiota (JP); Shigeru Matsuo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/027,433

(22) Filed: Feb. 7, 2008

(65) Prior Publication Data

US 2008/0140308 A1 Jun. 12, 2008

Related U.S. Application Data

(62) Division of application No. 10/932,061, filed on Sep. 2, 2004, now Pat. No. 7,355,528.

(30) Foreign Application Priority Data

Oct. 16, 2003 (JP) .............................. 2003-356500
Oct. 22, 2003 (JP) .............................. 2003-361385

(51) Int. Cl.
*G06G 7/70* (2006.01)
*G08G 1/00* (2006.01)

(52) U.S. Cl. ........................ 701/118; 701/117; 701/202; 701/209; 701/210; 340/995.13; 340/995.1

(58) Field of Classification Search ......... 701/117–119, 701/202, 209–210; 340/995.13, 995.1
See application file for complete search history.

(56) References Cited

U.S. PATENT DOCUMENTS 5,182,555 A * 1/1993 Sumner ...................... 340/905

(Continued)

FOREIGN PATENT DOCUMENTS

EP 987519 A2 * 3/2000

(Continued)

OTHER PUBLICATIONS

Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC. cited by other.*

(Continued)

*Primary Examiner*—Cuong H Nguyen
(74) *Attorney, Agent, or Firm*—Crowell & Moring LLP

(57) ABSTRACT

A traffic information providing system externally acquires traffic information including information relating to the travel time of a link, calculates a travel time for a non-provision link to which no travel time is provided through estimate/complement operation. The estimate/complement operation is carried out with use of travel times, emergencies, travel times of links in the vicinity of the non-provision link, and so on, obtained in the near past. The system stores and statistically processes the externally-acquired traffic information, and also estimates a travel time in the near future. When there is an abnormality in the acquired traffic information, the system deletes the abnormality, regards the information as a non-provision link, calculates a probability distribution of travel times of links, calculates a probability distribution of travel times of the entire route made up of a plurality of links, and also calculates a probability for a specific travel time range.

2 Claims, 22 Drawing Sheets

U.S. PATENT DOCUMENTS

| | | | | |
|---|---|---|---|---|
| 5,220,507 | A | * | 6/1993 | Kirson .................. 701/202 |
| 5,822,712 | A | * | 10/1998 | Olsson .................. 701/117 |
| 5,864,305 | A | * | 1/1999 | Rosenquist ............ 340/905 |
| 5,933,100 | A | * | 8/1999 | Golding ............. 340/995.13 |
| 6,222,836 | B1 | | 4/2001 | Sekiyama et al. |
| 6,532,414 | B2 | * | 3/2003 | Mintz .................. 701/117 |
| 6,542,808 | B2 | * | 4/2003 | Mintz .................. 701/117 |
| 6,546,330 | B2 | * | 4/2003 | Fushiki et al. ......... 701/118 |
| 6,560,532 | B2 | * | 5/2003 | Cayford ............... 701/209 |
| 6,941,222 | B2 | * | 9/2005 | Yano et al. ............ 701/209 |
| 7,103,470 | B2 | * | 9/2006 | Mintz .................. 701/117 |
| 7,212,905 | B2 | * | 5/2007 | Grill .................... 701/96 |
| 7,355,528 | B2 | * | 4/2008 | Yamane et al. ...... 340/995.13 |
| 7,366,606 | B2 | * | 4/2008 | Uyeki .................. 701/117 |
| 7,376,509 | B2 | * | 5/2008 | Endo et al. ............ 701/209 |
| 2002/0077742 | A1 | * | 6/2002 | Mintz .................. 701/117 |
| 2002/0082767 | A1 | * | 6/2002 | Mintz .................. 701/117 |
| 2002/0082771 | A1 | * | 6/2002 | Anderson ............. 701/209 |
| 2003/0069683 | A1 | * | 4/2003 | Lapidot et al. ......... 701/117 |
| 2004/0249559 | A1 | * | 12/2004 | Mintz .................. 701/117 |
| 2005/0071081 | A1 | * | 3/2005 | Hirose et al. .......... 701/210 |
| 2005/0093720 | A1 | * | 5/2005 | Yamane et al. ...... 340/995.13 |
| 2005/0231393 | A1 | * | 10/2005 | Berger et al. ........ 340/995.13 |
| 2005/0256639 | A1 | * | 11/2005 | Aleksic et al. ......... 701/210 |
| 2006/0106530 | A1 | * | 5/2006 | Horvitz et al. ......... 701/117 |
| 2007/0073477 | A1 | * | 3/2007 | Krumm et al. ......... 701/209 |
| 2007/0208494 | A1 | * | 9/2007 | Chapman et al. ....... 701/117 |
| 2008/0004802 | A1 | * | 1/2008 | Horvitz ................ 701/209 |
| 2008/0140308 | A1 | * | 6/2008 | Yamane et al. ......... 701/200 |

FOREIGN PATENT DOCUMENTS

| | | | |
|---|---|---|---|
| JP | 7-55494 | A | 3/1995 |
| JP | 7-129893 | | 5/1995 |
| JP | 7-129893 | A | 5/1995 |
| JP | 08315290 | A * | 11/1996 |
| JP | 9-287965 | A | 11/1997 |
| JP | 10-283591 | A | 10/1998 |
| JP | 10-332401 | A | 12/1998 |
| JP | 2000-259977 | | 9/2000 |
| JP | 2000-259978 | A | 9/2000 |
| JP | 2001-241959 | A | 9/2001 |
| JP | 2001-289656 | | 10/2001 |
| JP | 2001-356021 | | 12/2001 |
| JP | 2002-251698 | A | 9/2002 |
| JP | 2002-260142 | | 9/2002 |
| JP | 2003-16570 | A | 1/2003 |
| JP | 2003-356500 | * | 10/2003 |
| JP | 2003-361385 | * | 10/2003 |
| JP | 2005106610 | A * | 4/2005 |
| JP | 2007115272 | A * | 5/2007 |
| WO | WO 9801768 | A1 * | 1/1998 |

OTHER PUBLICATIONS

Towards Efficient Geographic Routing in Urban Vehicular Networks; Jerbi, M.; Senouci, S.-M.; Rasheed, T.; Ghamri-Doudane, Y.; Vehicular Technology, IEEE Transactions on; vol. 58, Issue 9, Nov. 2009 pp. 5048-5059; Digital Object Identifier 10.1109/TVT.2009.2024341.*

An Approach to Urban Traffic State Estimation by Fusing Multisource Information; Qing-Jie Kong; Zhipeng Li; Yikai Chen; Yuncai Liu; Intelligent Transportation Systems, IEEE Transactions on; vol. 10, Issue 3, Sep. 2009 pp. 499-511 Digital Object Identifier 10.1109/TITS.2009.2026308.*

Smoothing Vehicular Traffic Flow Using Vehicular-Based Ad Hoc Networking & Computing Grid (VGrid), Chen, A.; Khorashadi, B.; Chen-Nee Chuah; Ghosal, D.; Zhang, M.; Intelligent Transportation Systems Conference, 2006. ITSC '06. IEEE Sep. 17-20, 2006 pp. 349-354 ; Digital Object Identifier 10.1109/ITSC.2006.1706766.*

Modeling urban traffic: A cellular automata approach; Tonguz, O.K.; Viriyasitavat, W.; Fan Bai; Communications Magazine, IEEE; vol. 47, Issue 5, May 2009 pp. 142-150; Digital Object Identifier 10.1109/MCOM.2009.4939290.*

Optimization of the Mobile Router and Traffic Sources in Vehicular Delay-Tolerant Network; Niyato, D.; Ping Wang; Vehicular Technology, IEEE Transactions on; vol. 58, Issue 9, Nov. 2009 pp. 5095-5104; Digital Object Identifier 10.1109/TVT.2009.2025379.*

Performance Evaluation of SUVnet With Real-Time Traffic Data; Hong-Yu Huang; Pei-En Luo; Minglu Li; Da Li; Xu Li; Wei Shu; Min-You Wu; Vehicular Technology, IEEE Transactions on; vol. 56, Issue 6, Part 1, Nov. 2007 pp. 3381-3396 Digital Object Identifier 10.1109/TVT.2007.907273.*

A Traffic Resource Diffusion Scheme in Vehicular Networks; Zhu Xinjuan; Xu Bo; Information Technology and Applications, 2009. IFITA '09. International Forum on; vol. 1, May 15-17, 2009 pp. 318-321; Digital Object Identifier. 10.1109/IFITA.2009.63.*

Real-time road traffic classification using on-board bus video camera; Parisot, C.; Meessen, J.; Carincotte, C.; Desurmont, X.; Intelligent Transportation Systems, 2008. ITSC 2008. 11th International IEEE Conference on; Oct. 12-15, 2008 pp. 189-196; Digital Object Identifier 10.1109/ITSC.2008.4732628.*

A Method for Sharing Traffic Jam Information using Inter-Vehicle CommunicationShibata, Naoki; Terauchi, Takashi; Kitani, Tomoya; Yasumoto, Keiichi; Ito, Minoru; Higashino, Teruo;; Mobile and Ubiquitous Systems—Workshops, 2006. 3rd Annual International Conference on;Jul. 17-21, 2006 pp. 1-7 ;Digital Object Identifier 10.1109/MOBIQW.2006.3617.*

The research on drivers' route choice behavior in the presence of dynamic traffic information; Yuanfeng Zhou; Jianping Wu; Intelligent Transportation Systems Conference, 2006. ITSC '06. IEEE; Sep. 17-20, 2006 pp. 1304-1309; Digital Object Identifier 10.1109/ITSC.2006.1707403.*

Routing in stochastic networks; Key, R.; Networking, Sensing and Control, 2005. Proceedings. 2005 IEEE; Digital Object Identifier: 10.1109/ICNSC.2005.1461305; Publication Year: 2005 , pp. 861-866.*

Traveling Salesperson Problems for the Dubins Vehicle; Savla, K. et al.; Automatic Control, IEEE Transactions on; vol. 53, Issue: 6; Digital Object Identifier: 10.1109/TAC.2008.925814; Publication Year: 2008 , pp. 1378-1391.*

Data Quantity for Reliable Traffic Information in Vehicular Ad Hoc Networks; Hyoungsoo Kim et al.;Vehicular Technology Conference, 2007. VTC-2007 Fall. 2007 IEEE 66th ; Digital Object Identifier: 10.1109/VETECF.2007.299; Publication Year: 2007 , pp. 1401-1405.*

On Traveling Salesperson Problems for Dubins' vehicle: stochastic and dynamic environments; Savla, K. et al.; Decision and Control, 2005 and 2005 European Control Conference. CDC-ECC '05. 44th IEEE Conference on; Publication Year: 2005 , pp. 4530-4535.*

On Traveling Salesperson Problems for a double integrator; Savla, K.;et al. ; Decision and Control, 2006 45th IEEE Conference on; Digital Object Identifier: 10.1109/CDC.2006.377461; Publication Year: 2006 , pp. 5305-5310.*

Improved first responder localization for single-hop and multi-hop networks; Humphrey, David et al.; Position Location and Navigation Symposium (PLANS), 2010 IEEE/ION; Digital Object Identifier: 10.1109/PLANS.2010.5507252 Publication Year: 2010 , pp. 498-504.*

Probabilistic analysis of some navigation strategies in a dynamic environment; Sharma, R. et al.; Systems, Man and Cybernetics, IEEE Transactions on; vol. 23 , Issue: 5; Digital Object Identifier: 10.1109/21.260678 Publication Year: 1993 , pp. 1465-1474.*

Robust vehicle localization in urban environments using probabilistic maps; Levinson, J. et al.; Robotics and Automation (ICRA), 2010 IEEE International Conference on; Digital Object Identifier: 10.1109/ROBOT.2010.5509700; Publication Year: 2010 , pp. 4372-4378.*

* cited by examiner

FIG. 10A

| LINK NO. | LINK LENGTH (m) | STATISTICAL TRAVEL TIME (SEC) | | | |
|---|---|---|---|---|---|
| | | 10:00 | 10:05 | 10:10 | 10:15 |
| 460 | 600 | 72 | 86 | 108 | 144 |
| 461 | 1000 | 144 | 180 | 144 | 120 |
| 462 | 800 | 82 | 96 | 144 | 72 |
| 463 | 1200 | 173 | 288 | 432 | 216 |

FIG. 10B

| LINK NO. | LINK LENGTH (m) | STATISTICAL TRAVEL SPEED (Km/h) | | | |
|---|---|---|---|---|---|
| | | 10:00 | 10:05 | 10:10 | 10:15 |
| 460 | 600 | 30 | 25 | 20 | 15 |
| 461 | 1000 | 25 | 20 | 25 | 30 |
| 462 | 800 | 35 | 30 | 20 | 40 |
| 463 | 1200 | 25 | 15 | 10 | 20 |

TRAFFIC INFORMATION PROVIDING SYSTEM AND CAR NAVIGATION SYSTEM

RELATED APPLICATIONS

The present application is a divisional application of U.S. patent application Ser. No. 10/932,061, which claims priority to Japanese patent application no. JP 2003-356500 filed Oct. 16, 2003, and Japanese patent application no. JP 2003-361385, filed Oct. 22, 2003, the disclosures of each of which are incorporated by reference herein in their entirety.

BACKGROUND OF THE INVENTION

1. Field of the Invention

The present invention relates to a car navigation system and more particular, to a technique of processing traffic information such as traffic jam or travel time and a technique of receiving and outputting processed traffic information in a system for performing communication between a car terminal and a server.

2. Description of the Related Art

There are disclosed systems in which when start and end points are transmitted from a car terminal to a server, the server searches for a route, searches for traffic information, and then returning both of the route and the traffic information to the terminal, in JP-A-2001-356021 and JP-A-2001-289656. In these systems, all the traffic information existing on the route are searched for and returned to the terminal.

Such a technique for estimating a travel time based on other information with respect to a link having no information about travel time as traffic information (which will be referred to as non-provision link, hereinafter) as disclosed in JP-A-7-129893, is known. In the technique, the average vehicle speed of the link is calculated based on traffic jam or congestion information included in external information. And the complementary information for the non-provision link is calculated based on the calculated average vehicle speed. The travel time of the link is also estimated based on the average vehicle speeds of individual time zones for each of previously stored links.

Such a technique for finding a reliability in the predicted value of the run time as disclosed in JP-A-2002-260142, is known. In the technique, data about run times of a road section including the road in question until the current time are collected, a run time memory table having run time data past collected is searched for one of patterns similar in the run time, and a run time memory value for the pattern is used as a predicted run time ahead of N hours. By repeating such operations, a plurality of candidates of the predicted run time are found, most frequent one of the candidates is determined as the predicted run time, and the reliability of the predicted run time is found on the basis of a spread in the distribution of the candidates.

The technique disclosed in JP-A-7-129893 is intended to be applied to a vehicle route guiding system. However, traffic information is updated from moment to moment, and when traffic information past received are also included in the first-mentioned traffic information, a memory capacity and a processing quantity correspondingly become enormous. In such a vehicle route guiding system as not enough in the memory capacity and processing performance, generally speaking, it is difficult for the system to estimate a travel time of a non-provision link on a real time basis. In addition, it is also inefficient for individual vehicle route guiding systems to perform the same operations.

The technique disclosed in JP-A-2002-260142 has a problem from a viewpoint of convenience. For example, even when a prediction error Ws within a probability S is found, the error Ws may fail to fall in a practical range. For example, the prediction error Ws within 90% of a probability S for a predicted run time value of 20 minutes becomes 100 minutes or so.

SUMMARY OF THE INVENTION

In view of the above circumstances, it is therefore an object of the present invention is to enable processing of traffic information without imposing a burden on a device carried on a car or the like. A related object of the present invention is to provide accurate traffic information and its reliability information with respect to many links including a non-provision link, by integrally suitably processing traffic information such as VICS (Vehicle Information Communication System) traffic information that is not so high in reliability and stability.

In the above related art, it may occur such a situation that the longer a route is the larger the quantity of data about traffic information is proportionally, thus prolonging a communication time. A communication fee imposed on the user also becomes correspondingly high. Further, with respect to traffic information at a position so much away from the current location, the traffic information when searched for may becomes different from the traffic information when the car arrived at that position. In other words, even when all the traffic information on a route have been downloaded in a route search mode, only part of the downloaded traffic information in the vicinity of the own vehicle can be actually used effectively, and even when traffic information at a position too much away therefrom is obtained, the information is not always used effectively.

Another object of the present invention is to lighten a user's communication fee burden and to distribute traffic information seemingly more effective at that time point, by reducing a communication time and a quantity of communication information in acquiring traffic information on a route.

The traffic information providing system in accordance with the present invention creates traffic information to be used in the car navigation system. The traffic information providing system includes a traffic information acquiring means for externally acquiring traffic information including information about a travel time for each link forming a road on a map, and a complementing means for calculating traffic information on the travel time by estimating and complementing a non-provision link to which information on the travel time is not provided.

In this connection, the traffic information providing system may include a storage means for storing the traffic information acquired by the traffic information acquiring means and a statistical means for statistically processing past traffic information so far stored by the storage means.

The traffic information providing system of the present invention also includes a traffic information acquiring means for externally acquiring traffic information including information about a travel time for each link forming a road on a map, and an abnormal value deciding means for deciding abnormal data in the traffic information acquired by the traffic information acquiring means. The abnormal value deciding means has at least one of a function of deciding that data having a congestion frequency of a predetermined value or more is abnormal, a function of deciding that traffic information having a deviation larger than traffic information corresponding to a plurality of days in an identical time zone is abnormal, and a function of comparing a travel time and congestion information and deciding that the congestion information is abnormal when one of the travel time and congestion information varies in a normal range but when the other indicates a constant values.

The traffic information providing system of the present invention also includes a traffic information acquiring means for externally acquiring traffic information including information about a travel time for each link forming a road on a map, and the traffic information acquiring means has a storage means for storing the acquired traffic information. The traffic information providing system also includes a link travel-time probability calculating means for calculating a probability distribution relating to a travel time for each link, a route trip-time probability calculating means for calculating a probability distribution relating to travel times of a specific route formed by a plurality of links with use of the probability distribution of the travel time of the link calculated by the link travel-time probability calculating means, and a means for calculating a probability of the travel time of the specific route calculated by the route trip-time probability calculating means.

The car navigation system of the present invention includes a means for acquiring information created by the traffic information providing system and relating to a probability distribution of travel time for each link; a route trip-time probability calculating means for calculating a probability distribution of the travel time of a specific route made up of a plurality of links with use of the probability distribution of travel time of each link; a setting means for setting a travel time range or a travel time probability for the specific route; a reliability calculating means for calculating a probability that the travel time of the specific route is in the travel time range set by the setting means with use of the probability distribution of the trip time of the specific route, and when the travel time probability of the specific route is set by the setting means, for calculating such a travel time range that the travel time of the specific route falls in the travel time probability set by the setting means with use of the probability distribution of the travel time of the specific route; and a reliability display means for displaying a result calculated by the reliability calculating means.

Another terminal in the present invention is provided with a position measuring means for measuring the position of own terminal, a target position setting means for setting target position information, a communication means for transmitting and receiving data to and from an information center, a route guiding means for guiding the car along a route to the target position, and a traffic information acquiring means for acquiring traffic information at least on the route or relating to the vicinity of the route. And the terminal also has a means for specifying a traffic information acquirement range. When issuing a traffic information acquirement request to the information center, the terminal uploads the specified acquirement range to the information center.

The terminal has a display screen as a means for the user to specify and enter the traffic information acquirement range. The terminal also has previously a default value within the traffic information acquirement range, and the default value is also displayed on the screen. And the terminal uploads its status to the information center, and the information center decides the traffic information acquirement range according to the uploaded status of the terminal.

When issuing a traffic information acquirement request to the information center, the terminal uploads the route information held by the terminal to the information center. The information center transmits or received data to or from the terminal, and holds it as an extraction range of the uploaded traffic information on the route or relating to the vicinity of the route. The information center, when receiving the request from the terminal to acquire the traffic information on the route or relating to the vicinity of the route, also receives the status of the terminal and decides the traffic information extraction range. The information center already the default value of the traffic information extraction range, receives a parameter indicative of the traffic information extraction range from the terminal, and extracts the traffic information.

For the traffic information acquisition/extraction range; at least one of a specific or all sections on the route, a section through which the car passes in a certain time, a section away by a constant distance from the position of own car or for which the size of the information is equal to or smaller than a constant value, all non-passage routes, and a section between two points on the route; is specified.

During connection to the information center and downloading of the target information, if emergency information is held in the information center, then the terminal downloads the emergency information together and displays it. When the emergency information is included in the downloaded information, the terminal displays the emergency information preferentially to the initial target information.

In accordance with the present invention, since traffic information is processed by the traffic information providing system, a processing burden imposed on the car navigation system mounted on the car or the like can be lightened.

In accordance with the present invention, further, since a traffic information reception range is specified, the communication time or the quantity of communication information can be reduced, user's communication fee burden can be lightened, and traffic information seemingly most effective at that time points can be provided.

Other objects, features and advantages of the invention will become apparent from the following description of the embodiments of the invention taken in conjunction with the accompanying drawings.

BRIEF DESCRIPTION OF THE DRAWINGS

FIG. 10A shows a statistical travel time for each link and time zone for explaining how to predict a route travel time;

FIG. 10B shows a statistical travel speed for each link and time zone;

DETAILED DESCRIPTION OF THE EMBODIMENTS

Figure 1:
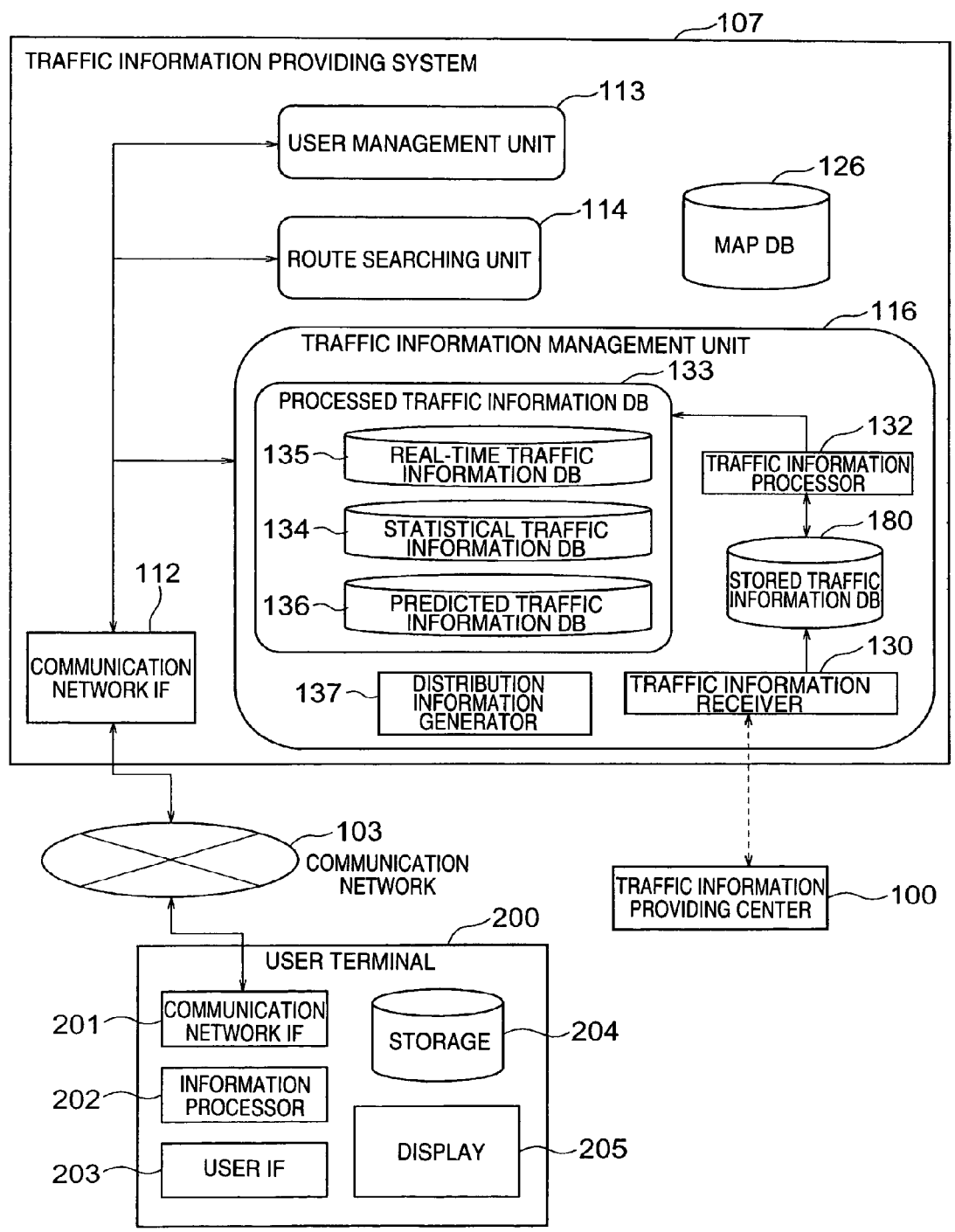
FIG. 1 shows an example of an arrangement of a traffic information providing system.

Explanation will be made in connection of an embodiment of the present invention with reference to the accompanying drawings. FIG. 1 schematically shows a traffic information system to which an embodiment of the present invention is applied. The traffic information system a user terminal 200, a communication network 103, a traffic information providing system 107, a traffic information providing center 100 for providing information such as a VICS center. The user terminal 200 has communication network interface (IF) 201, an information processor 202, a user IF 203, a storage 204, and a display 205. The information processor 202 receives various sorts of traffic information from the traffic information providing system 107 via the communication network IF 201 and communication network 103, and stores the received traffic information in the storage 204. The information processor also accepts a user's request via the user IF 203, suitably processes the traffic information according to the contents of the request, and displays it on the display 205. In this connection, the user terminal 200 is not necessarily required to be mounted on a vehicle.

The traffic information providing system 107 has a communication network IF 112, a user management unit 113, a route searching unit 114, a map database (DB) 126, and a traffic information management unit 116. The communication network IF 112 supports communication mediation between each unit of the traffic information providing system 107 and the user terminal 200 via the communication network 103. For example, when the communication network 103 is the WWW (World Wide Web) or Internet, CGI (Common Gate Interface) can be used as the communication network IF 112. The user management unit 113 registers and edits user information. The route searching unit 114 calculates a route from the position of the car to a target position according to a route searching technique such as the Dijkstra algorithm using map data and so on on the basis of information about a departure position (current position) and a target position or on the basis of information about the departure (current) position, the target position and a passing-through position, sent from the user. In this connection, when the user terminal has a route searching function, provision of the route searching unit 114 in the traffic information providing system 107 is not indispensable.

Registered and managed in the map DB 126 for each of mesh regions obtained by dividing a map into a plurality of regions are data about the identification codes (mesh IDs) of the mesh regions and about links forming roads included in the mesh region. The link data includes a link identification code (link ID), coordinate information of two nodes (start and end nodes) forming a link, attribute information on national or prefectural roads, information indicative of restricted speed, link length/width, information on the trip speed for each congestion degree, and the IDs (connection link IDs) of links connected to the two nodes. Also included in the map data are information on main intersections and information (such as title, type and coordinate information) about map structures other than roads included in the corresponding mesh region.

Figure 2:
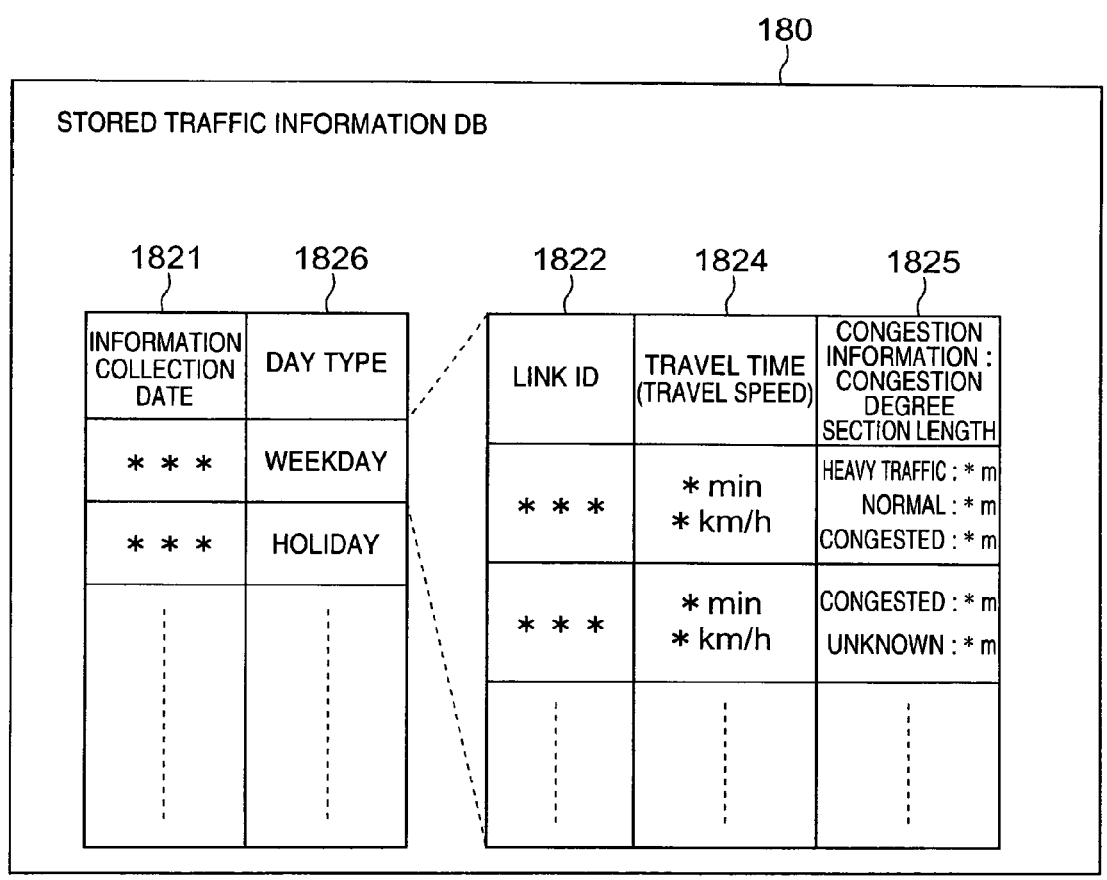
FIG. 2 shows how stored traffic information database DB manages traffic information.

The traffic information management unit 116 has a traffic information receiver 130, a stored traffic information DB 180, a traffic information processor 132, a processed traffic information DB 133, and a distribution information generator 137. The traffic information receiver 130 receives traffic information including traffic, congestion, travel time, restriction/fault information, information on empty or full parking lot, and intersection signal information, periodically sent from the traffic information providing center 100. The stored traffic information DB 180 registers and manages various sorts of traffic information received from the traffic information receiver 130. FIG. 2 shows an example of traffic information to be registered and managed by the stored traffic information DB 180. The stored traffic information DB 180 manages the traffic information on each collection date (registration date) 1821. The DB also manages the traffic information for each link ID 1822. The traffic information includes information 1824 about link travel time (travel speed) and information 1825 about congestion such as congestion degree and congestion length. The stored traffic information DB 180 also manages information about the type 1826 of a day corresponding to the collection date 1821. The day type is classified by weekday and holiday, by weekday, or by action patterns of common or general users. In the latter action classification case, for example, the day type may be classified by the consecution of weekdays or holidays, e.g., by the first, middle and last days in the consecutive weekdays or by the first, middle and last days in the consecutive holidays. Weather may be considered to be added to the above classification.

The traffic information processor 132 deletes an abnormal value (singular value) in the stored traffic information DB 180, and suitable processes (complements or statistically processes) a link having no information, detailed processing operations of which will be explained later.

The processed traffic information DB 133 manages various sorts of traffic information created or generated by the traffic information processor 132. The processed traffic information DB 133 has a real-time traffic information DB 135, a statistical traffic information DB 134 and a predicted traffic information DB 136 for storing traffic information relating to future traffic statuses. The real-time traffic information DB 135 manages the current traffic information for each link. The statistical traffic information DB 134 manages the traffic information generated through the statistical processing for each day type, each link and each time (time zone). The predicted traffic information DB 136 manages future traffic information for each day type, each link and each time (time zone).

The distribution information generator 137, in response to a request from the user terminal 200, converts or molds the information of the processed traffic information DB 133 to information having a predetermined format, generates distribution information, and returns the generated information to the user terminal.

Figure 3:
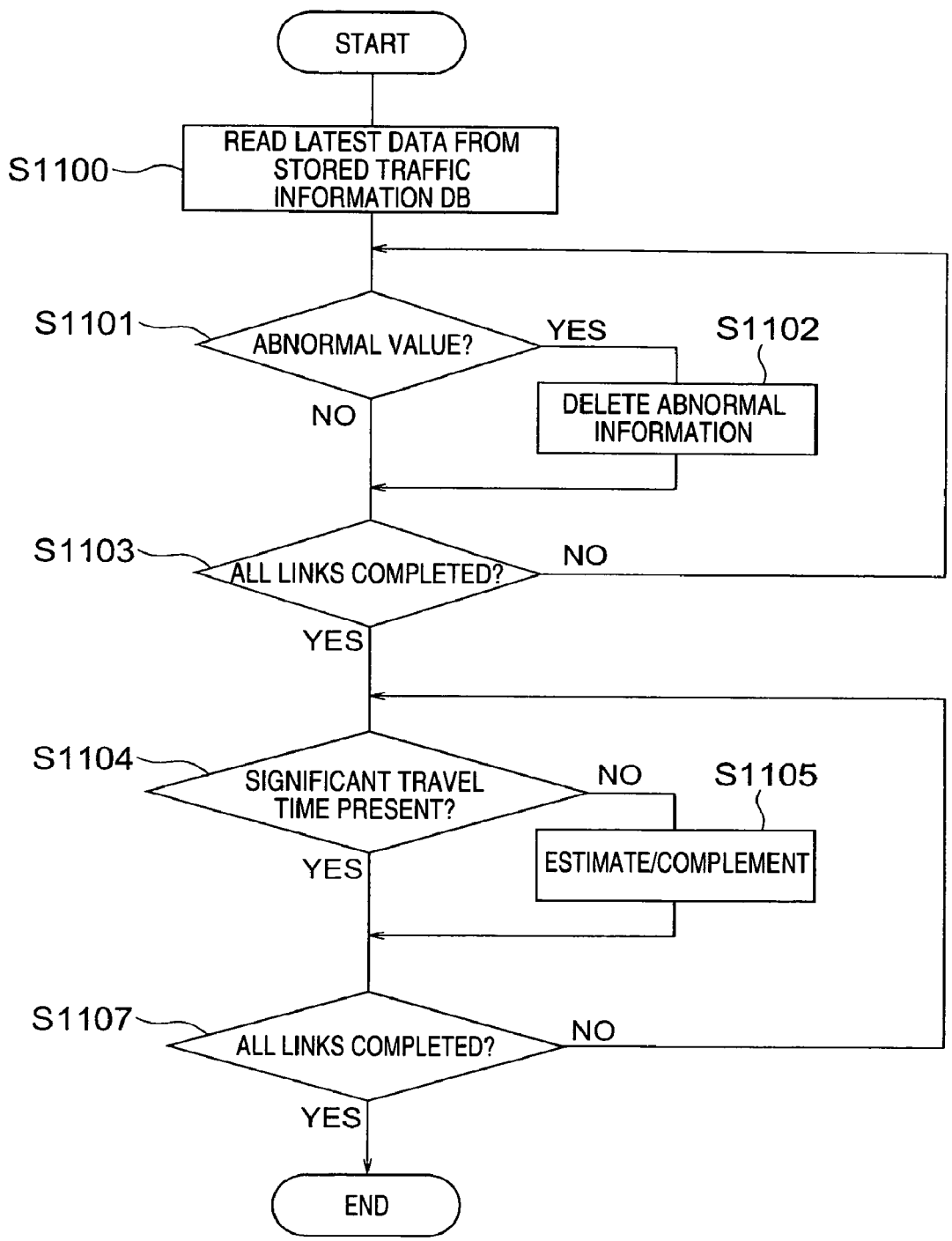
FIG. 3 is a flowchart showing a flow of operations for creating traffic information on a real time basis.

Explanation will next be made as to how the traffic information processor 132 generates processed traffic information. First how to generate real-time traffic information will be explained according to a flowchart of FIG. 3. When generating the real-time traffic information, the traffic information processor 132 first refers to the collection date 1821 and reads the latest traffic information (step S1100). Next, the traffic information processor 132 decides whether or not the read traffic information is abnormal (singular) (step S1101). For example, when a link travel time corresponding to a high speed largely exceeding a restricted speed is included in the information or when a link travel time not smaller than a predetermined value or a link travel time corresponding to a too slow speed not exceeding the predetermined speed is included in the information, the traffic information processor determines that the read traffic information is abnormal. Or when consistency is not provided between the link travel time and the congestion information, as when the link travel time is different largely from a travel time obtained by converting the congestion degree to a speed, the both traffic information may be decided as abnormal. When deciding the information as abnormal, the traffic information processor 132 deletes the traffic information decided as abnormal from the stored traffic information DB 180 not to be used in the subsequent operations (step S1102). The operations of the steps S1101 and S1102 are carried out for traffic information of all links of the latest traffic information managed by the stored traffic information DB 180 (step S1103).

Next, the traffic information processor 132 decides whether or not significant travel time information is provided to each link (step S1104). In this connection, the word "significant travel time information" as used herein refers to travel time information not decided as abnormal through the abnormal value decision and still remaining in the stored traffic information DB 180. And a link (non-provision link), to which the significant travel time information is not provided, is subjected to estimate/complement operation (details of which will be explained later) (step S1105). The operations of the steps S1104 and S1105 are carried out for all the links (step S1107). Through the above operations, real-time traffic information is generated. And the traffic information processor 132 stores the generated real-time traffic information in the real-time traffic information DB 135. When the above operations are executed at intervals when traffic information is newly registered by the traffic information providing center 100, the latest real-time traffic information can be held.

Figure 4:
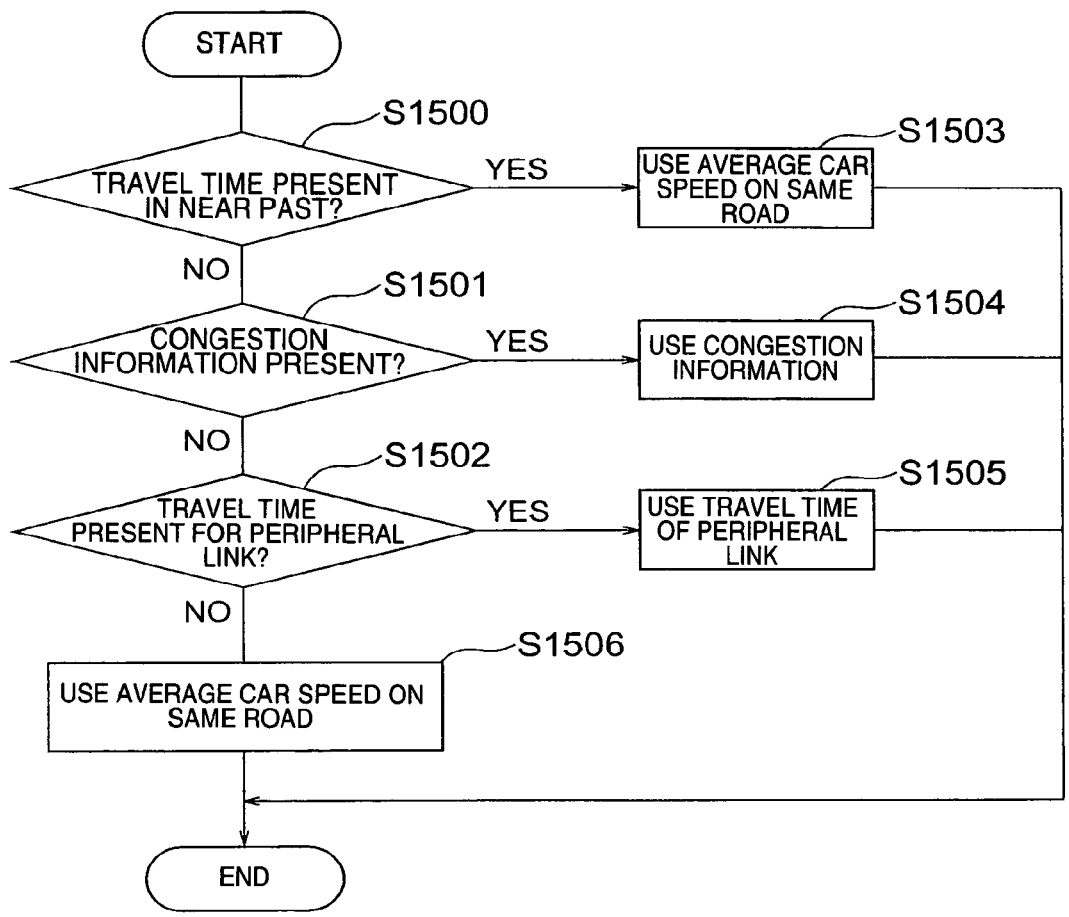
FIG. 4 shows a flow of complementing operations.

Explanation will now be made as to the estimate/complement operation S1105. Even when there is no significant link travel time information in a link to be subjected to be estimated and complemented, the travel time of the non-provision link can be estimated, complemented and calculated on the basis of other available traffic information (alternative traffic information). Explanation will be made as to the estimate/complement operation, by referring to a flowchart of FIG. 4.

(a) The traffic information processor 132 first decides whether or not a travel time for a non-provision link is included in past traffic information (step S1500). When a travel time for a non-provision link is included (YES in the step S1500), the traffic information processor 132 refers to the information collection date 1821, and applies one of the past link travel times most close to the current time as the travel time of the non-provision link (step S1503). However, if a significant travel time information can be obtained only when the most-close link travel time is dated older by a predetermined time (e.g., 1 hour) or more than the current time, the past link travel time is not applied. When a plurality of significant travel times are present by going back to a predetermined time, the significant travel times are weighted in an earlier order of time, and an average value thereof may be applied.

Figure 5:
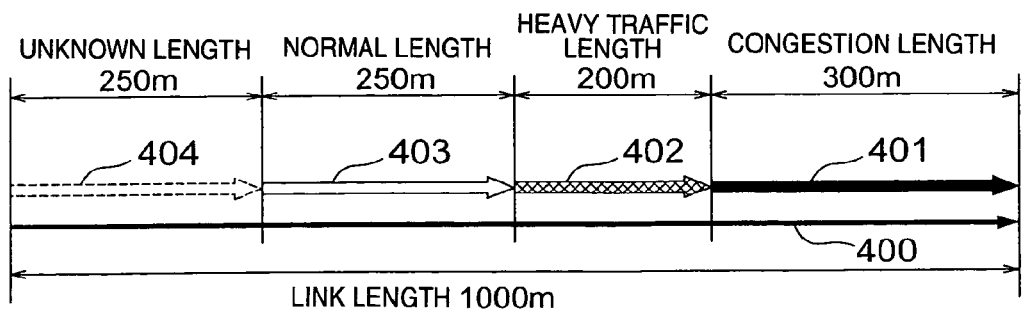
FIG. 5 is a diagram for explaining the complementing operation of an unknown section of a link relating to a degree of congestion.

(b) When a travel time for a non-provision link is not included in the past traffic information (NO in the step S1500), the traffic information processor 132 decides whether or not congestion information is included in the traffic information of the non-provision link (step S1501). If the congestion information is included (YES in the step S1501), then the traffic information processor 132 calculates the link travel time on the basis of the congestion degree and congestion length of the non-provision link with use of a travel time (moving speed) corresponding to each congestion degree for each predetermined road type (step S1504). At this time, if a section having an unknown congestion degree is present in the non-provision link, then the congestion degree of the unknown congestion-degree section is regarded as normal. When a congestion degree (congestion length 401 of 300 m, heavy-traffic length 402 of 200 m, normal length 403 of 250 m) in an identical link 400 is known as shown in FIG. 5, the traffic information processor 132 first finds a length rate for the congestion degree. And a congestion length for each congestion degree is found by multiplying the length rate of each congestion degree by the length of a unknown congestion-degree section 404. In FIG. 5, when a unknown congestion-degree section (250 m) is applied to each length, the congestion length is 100 m, the heavy-traffic length is 67 m, and the normal length is 83 m. Through the above operations, a congestion degree and its length are found for the unknown congestion-degree section and thus a travel time for a non-provision link can be calculated.

(c) When congestion information is not included in the traffic information of the non-provision link (NO in the step S1501), the traffic information processor 132 decides whether or not a significant travel time is included in the traffic information of links in the vicinity of the non-provision link (e.g., within a predetermined distance of 2 km) (step S1502). If the significant travel time is included (YES in the step S1502), then the traffic information processor 132 selects specific one from the links in the vicinity of the non-provision link, and calculates a travel time for the non-provision link from the travel time of the selected link (step S1505). Now, from the viewpoint of estimation accuracy, it becomes important which link is selected. To this end, how to select the link will be explained with use of an exemplary virtual road network of FIG. 6. In the drawing, R1 denotes a national road No. 1, Pref. 1 (Pref. R1) denotes a prefectural road No. 1, City 1 (City R1) denotes a city road No. 1, and so on. Arrows 410 to 418 and 420 to 427 given along the national road No. 1 and the prefectural road No. 1 indicate the presence or absence of significant travel time information. More specifically the solid-line arrows 410 to 418 mean links having significant travel time information present therein; whereas, the dashed-line arrows 420 to 427 means links having significant travel time information not present therein. In this example, with regard to the dashed-line arrows 420 to 427, explanation will be made as to how the traffic information processor 132 selects suitable one from peripheral links having significant travel time information.

The traffic information processor 132 first (i) selects ones of links in the vicinity of the non-provision link which belongs to the same road (e.g., national road No. 1) as the non-provision link. The traffic information processor 132 (ii) selects one of the selected links which spans the main intersections 430 to 433 during connection with the non-provision link a smallest number of times. The main intersection may be an intersection whose traffic condition largely varies, e.g., which forms a change point such as a congestion bottleneck in the traffic condition, or be an intersection where main roads such as prefectural and national roads and an expressway cross each other. At this time, priorities may be applied to the main intersections 430 to 433 in an ascending order of straddling frequency to select a plurality of links. When the link section is not done in Paragraph (i), the traffic information processor 132 performs the link selection of Paragraph (ii) for all links in the vicinity of the non-provision link. The traffic information processor 132 next select one of the selected links which has a smallest distance from the non-provision link. However, when a link is directly connected to the non-provision link or has a smallest distance therefrom but when the link is located on the opposite side (opposite car lane) to the non-provision link, the traffic information processor 132 does not select the link. In this case, priorities may be applied to links in an increasing order of distance from the non-provision link to select a plurality of links. Whether to be an identical road, whether to be a main intersection, or whether or not the link is directly connected can be decided by examining link data and intersection information in the map data. When priorities are applied to links to select a plurality of links, the traffic information of the selected links are weighted in the priority order and averaged to be used for calculation of the travel time of the target link.

Figure 6:
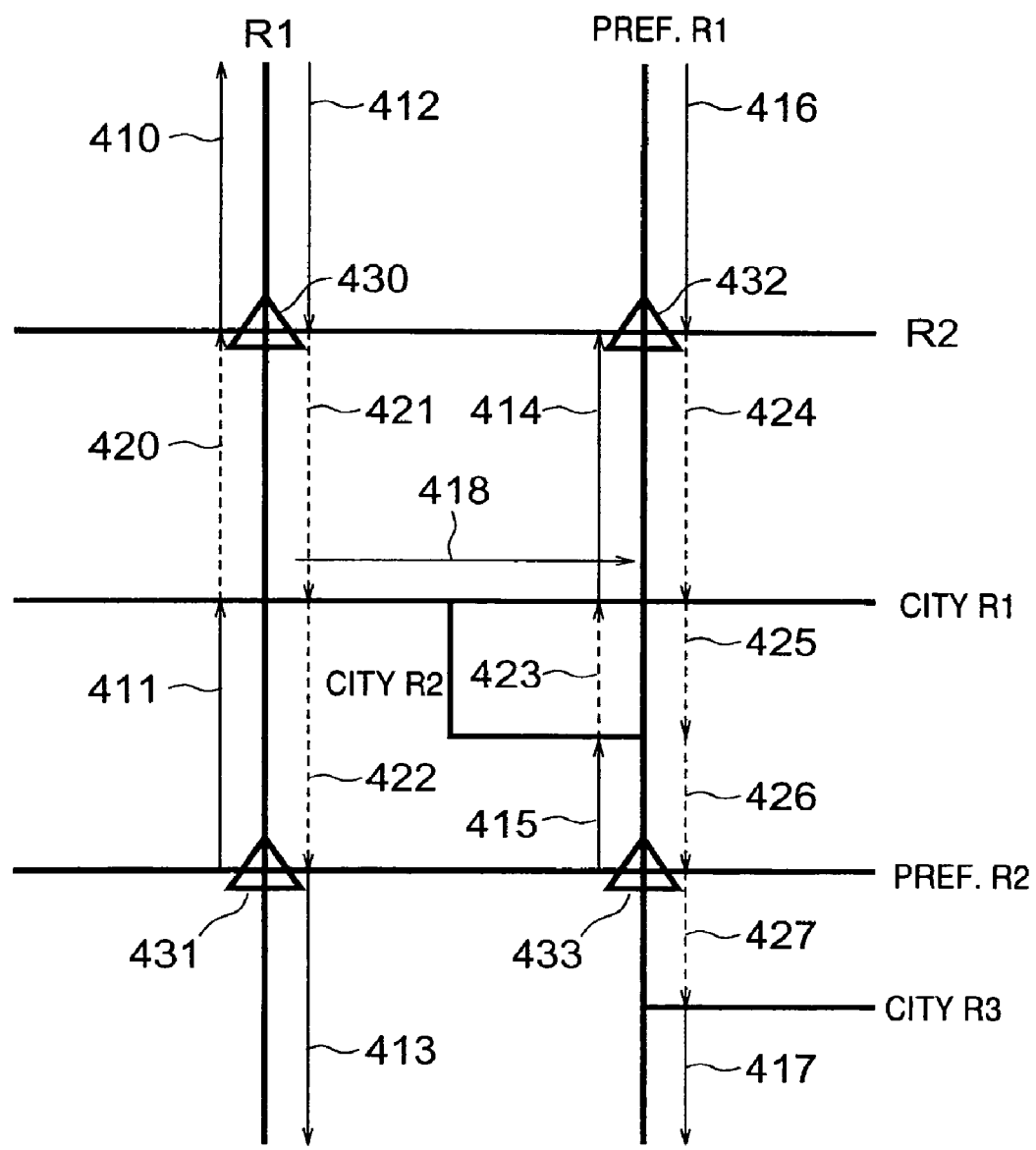
FIG. 6 is a road network for explaining how to complement the travel time of a non-provision link using the travel time of a peripheral link.

According to the link selection method mentioned above, a link 411 is selected most preferentially in order to complement and estimate a travel time for a link 420 in FIG. 6. A link 410 is next selected. For a link 421, a link 412 is selected most preferentially. For a link 422, a link 413 is selected most preferentially. For links 423 and 425, links 414 and 415 are selected with the same priority. In this case, an average value of traffic information of the both links is used to calculate a travel time for the link 423. Similarly, for a link 424, a link 416 is selected most preferentially, and for links 426 and 427, a link 417 is selected most preferentially. In this manner, the traffic information processor 132 suitably selects links in the vicinity of the non-provision link and calculates a travel time for the non-provision link using the travel times of the selected links.

(d) When a link having a significant travel time information is not present in the vicinity of the non-provision link (NO in the step S1502), the traffic information processor 132 extracts links having the same road attributes (mesh, road, road type, direction, etc.) as the non-provision link (e.g., the same national road) from the map DB 126. For the extracted links, the traffic information processor 132 searches the stored traffic information DB 180 for their travel times and finds an average travel speed therefrom. The traffic information processor finds a travel time for the non-provision link from the average travel speed and the link length of the non-provision link (step S1506).

Figure 7:
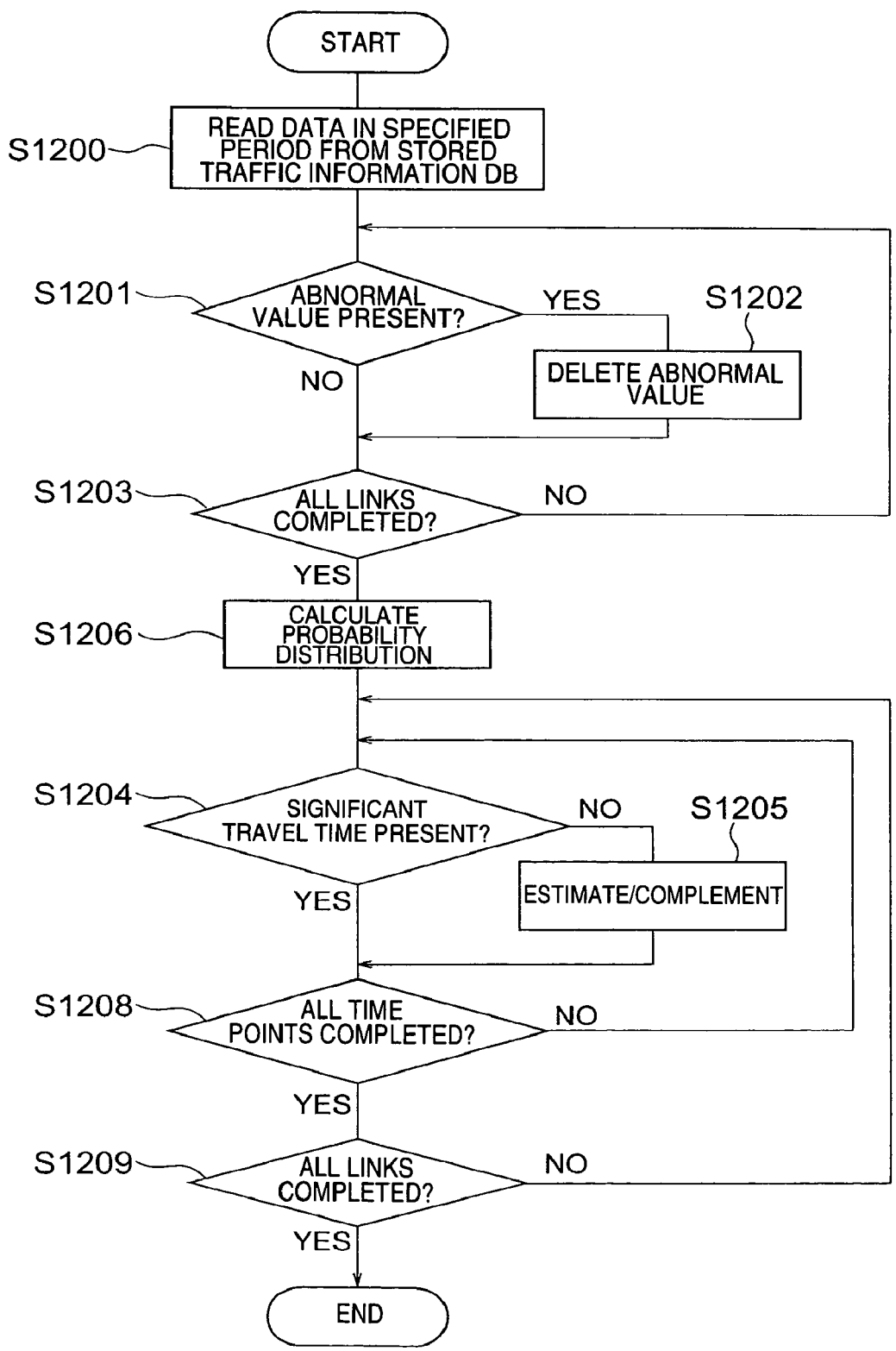
FIG. 7 is a flowchart showing a flow of operations of creating a statistical travel time.

Explanation will then be made as to how to generate statistical traffic information according to a flowchart of FIG. 7. The traffic information processor 132 first reads out traffic information in a specified period (e.g., about weekdays in past half year) from traffic information stored in the stored traffic information DB 180, by referring to the information collection date 1821 and the day type 1826 (step S1200). In the aforementioned creating operation of real-time traffic information, it is only required to read out the latest traffic information. In the creating operation of statistical traffic information, however, the traffic information processor 132 reads out traffic information corresponding to a plurality of times of a plurality of days (corresponding to a full 24-hour time zone) to be processed. The specified period is previously set according to applications of the statistical traffic information or the like.

The traffic information processor 132 then decides whether or not the read-out traffic information is abnormal (singular) for each link (step S1201). Similarly to the above method for generating real-time traffic information, such an abnormal value deciding method can be employed that the traffic information processor decides it as abnormal when link travel time having a too high or slow speed is included in the traffic information or when inconsistency is detected between the congestion degree and the travel time. The presence or absence of an abnormality may be decided by comparing the traffic information with traffic information of another day having the same day type 1826. More specifically, the abnormal value deciding method includes a method wherein, when a congestion time (rate) in one day exceeds a predetermined value (e.g. 5 hours), traffic information corresponding to the full day are decided as abnormal; and a method wherein, when one of the traffic information corresponding to a plurality of days in an identical time zone has a value largely different from the values of the other information (has a remarkably large deviation), the traffic information is decided as abnormal.

The traffic information processor 132 deletes the traffic information decided as abnormal from the stored traffic information DB 180 and does not use it in the subsequent processing (step S1202). The operations of the steps S1201 and S1202 are applied all the traffic information of links in the specified period (step S1203).

Figure 8:
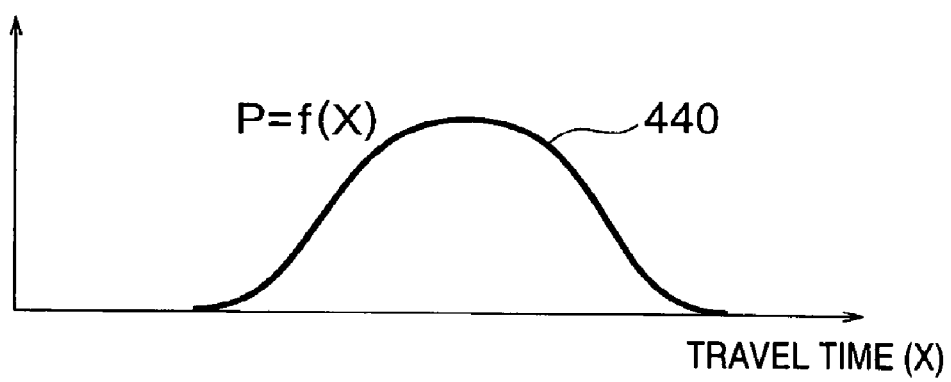
FIG. 8 shows an example of a probability distribution relating to a link travel time.

Next, on the basis of traffic information not deleted through the abnormal information deleting operation (step S1202), the traffic information processor 132 statically processes the traffic information, and creates statistical traffic information such as travel time (travel speed) and congestion degree for each day type, each link an each time (time zone). At this time, the traffic information processor 132 finds a probability distribution (probability dense function 440) relating to link travel time as shown in FIG. 8 for each day type, each link and each time (time zone) (step S1206).

The traffic information processor 132 next refers to the created statistical traffic information, and decides whether or not significant travel time information is provided for each link (step S1204). And with respect to the non-provision link to which significant travel time information is not provided, the traffic information processor, similarly to the real-time traffic-information creating operation, estimates and complements a travel time from the traffic information, etc. of the other links, and adds the obtained traffic information to the statistical traffic information (step S1205). The estimate/complement method can be carried out similarly to the estimate/complement operation in the real-time traffic-information creating operation. When calculating a travel time with respect to a time (target time) at which the link travel time is not provided, the traffic information processor examines whether or not a time (time zone) during which the link travel time is provided is present in a predetermined time range (e.g., 5 hours) before and after the target time. When the link travel time is provided, the link travel time is employed as a travel time for the target time. The predetermined time range is previously set to a time range in which the traffic condition will be seemed not to vary largely. The operations of the steps S1204 to S1206 are carried out for all times (step S1208). As a result, travel times for all times (time zones) of the link can be found. Further, the operations of the steps S1204 to S1208 are carried out for all links (step S1209). As a result, statistical traffic information in a wide area is complemented. When such a processing flow is executed at predetermined timing, e.g., at intervals of one month, season or one year; statistical traffic information can be stably provided without lowering the freshness of information.

Explanation will then be made as to how to create predicted traffic information. When creating predicted traffic information with regard to a specific link (target link), the traffic information processor first read out a travel time Td'(t) of the latest target link at a current time t from the real-time traffic information DB 135. The traffic information processor then searches the predicted traffic information DB 136 for a travel time Td(t) of the target link at the current time t and for a travel time Td(t+n) to be predicted at a near future time (t+n) after passage of a predetermine time. And the traffic information processor multiplies the travel time Td(t+n) by [travel time Td'(t)/travel time Td(t)] to obtain a predicted travel time Td' (t+n) of the target link at the time (t+n). When the above operations are carried out for each link, the predicted traffic information DB 136 having future data in a wide area can be formed. When the traffic information processor executes the above processing flow at intervals of a time (usually, 5 minutes) updated by the traffic information providing center 100, the processor can quickly and efficiently provide predicted traffic information to the user.

Figure 9:
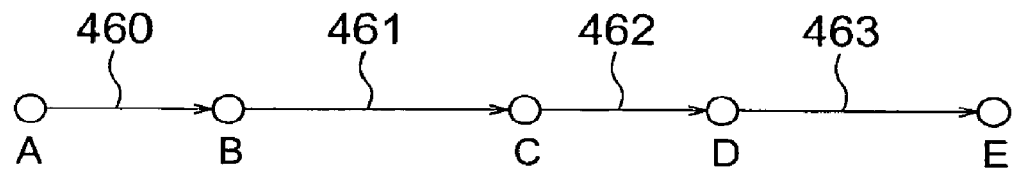
FIG. 9 is a road network for explaining an example of how to utilize the link travel time.
Figure 11:
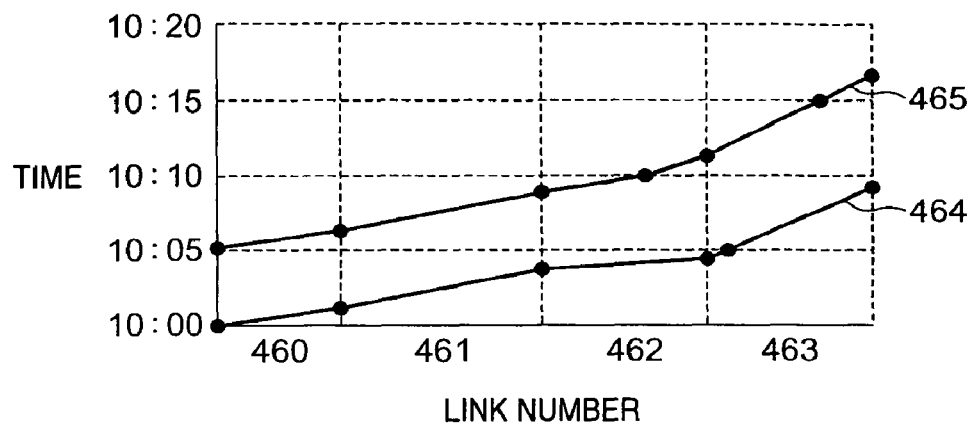
FIG. 11 shows a running status in the course of a route as an example of explaining how to predict a route travel time.

Explanation will next be made as to an example of calculating a travel time for a specific route made up of a plurality of links with use of link travel times (significant travel times) stored in the statistical traffic information DB 134. As an example of a simple road network, FIG. 9 is considered. In the drawing, A to E denote intersections, and 460 to 463 denote links. It is assumed that link lengths of the links 460 to 463 as well as significant travel times and statistical travel speeds for each time zone are as shown in FIGS. 10A and 10B. In the drawings, "10:00" means significant travel times or statistical travel speeds at time points included in a time period starting at 10:00 and ending at 10:05 (not included). The statistical travel speed is found from the significant travel time and the link length for each time zone. Explanation will be made as to how to calculate a significant travel time between the intersections A and E. When the car starts at a time 10:00:00 from the intersection A, it is estimated that it takes 72 seconds (30 km/h in average speed) for the car to pass through the link 460. Since a time point 10:01:12 at which the car will probably arrive at the link 461 does not reach 10:05 yet, the traffic information processor selects "25 km/h" in the column "10:00" as a predicted travel speed of the next link 461. For this reason, a travel time necessary for passage of the car through the link 461 is 144 seconds, and a total travel time from the intersection A is 216 seconds. Similarly, a travel time necessary for passage through the link 462 is calculated to be 82 seconds (298 seconds in total time). Since a travel time necessary for passage through the last link 463 is 173 seconds (471 seconds in total time), it is required to change the speed for "10:05" on the way. That is, since the speed "10:00" (25 km/h) is selected for first 2 seconds after the car enters the link 463, a run distance is about 14 m during the first time. And a speed "10:05" (15 km/h) is selected for the remaining distance of 1186 m. Thus it takes about 285 seconds for the car to pass through the remaining part of the link. As a result, a travel time necessary for passage through the link 463 is calculated to be 287 seconds (585 seconds in total time). From the above consideration, it is estimated that the car departing from the intersection A at 10:00:00 will arrive at the intersection E at a time "10:09:45", and thus the car running status of the entire route is as shown by a graph 464 in FIG. 11. Similarly, the running status of the car departing from the intersection A at a time "10:05:00" is as shown by a graph 465 in FIG. 11, a significant travel time until the intersection E is calculated to be 759 seconds, and an estimated arrival time is to be "10:17:39".

Explanation will then be made in connection with an example of calculating a probability distribution of travel time of a specific route including a plurality of links as a application example of the probability distribution. Explanation will be made, in particular, as to how to find a probability distribution of travel time of a route AE from the intersection A to the intersection E in the road network of FIG. 9. As in the above case, the traffic information processor can know a probability distribution of time points in each link considering the time passage of the car running with a departure time from the intersection A as a start point, by referring to the statistical traffic information DB 134. A probability f for travel times X1, X2, X3 and X4 of the links 460, 461, 462, and 463 is f460(X1), f461(X2), f462(X3), and f463(X4) respectively. The probability f can take various values according to the X1, X2, X3, and X4 as shown in FIG. 8. Assuming now that probability distributions of link travel times are independent of each other, then a probability f(X) that the travel times of the links 460, 461, 462, and 463 are x1, x2, x3, and x4 respectively (the travel time X of the route AE being x1+x2+x3+x4), is expressed by an equation which follows.

$$f(X) = f460(x1) \cdot f461(x2) \cdot f462(x3) \cdot f463(x4) \tag{1}$$

Figure 12:
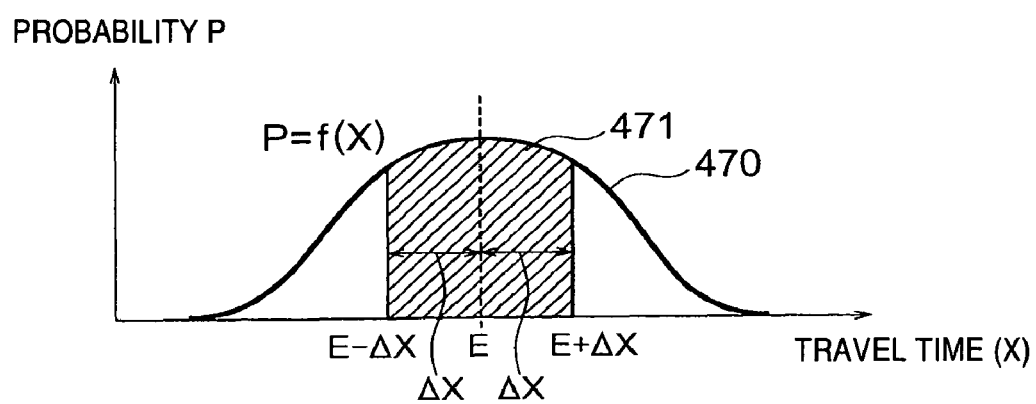
FIG. 12 is a diagram for explaining how to find a probability of the route travel time according to a probability dense function.

When the traffic information processor calculates possible combinations of all the X1, X2, X3, and X4 and adds them together for the same X, the processor can obtain a probability dense function f(X) with respect to a travel time X for the route AE. And the traffic information processor can find an expected value E for the travel time of the route AE, a deviation σ, etc using the probability dense function f(X). When such a probability dense function 470 as shown in FIG. 12 is used, further, the traffic information processor can find a probability that the travel time X is include in a range of E±ΔX as a ratio of the area of a hatched area 471 to an area surrounded by the probability dense function 470 and its X axis line. By changing ΔX (difference from E), the traffic information processor can find a probability P (ΔX) of various range of travel times.

The application example of link travel time or the application example of the probability distribution of travel time has been explained above. However, the operations involved by these examples may be carried out by the traffic information providing system 107 or by the user terminal 200.

Figure 13:
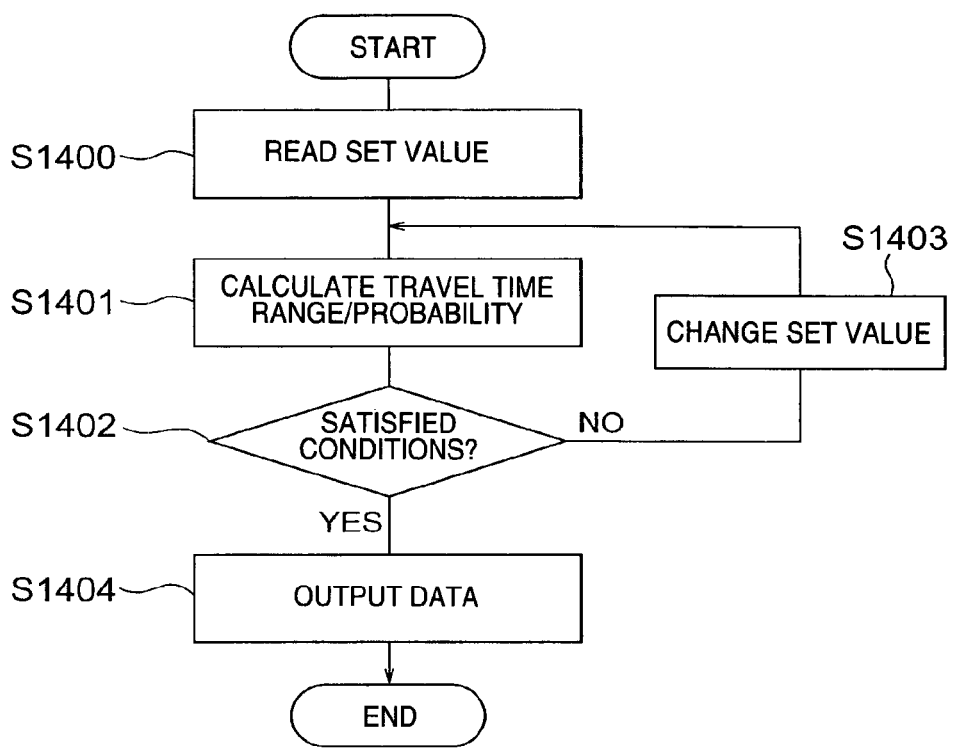
FIG. 13 is a flowchart showing a flow of operations of displaying a probability and so on relating to the route travel time on a user terminal.
Figure 14:
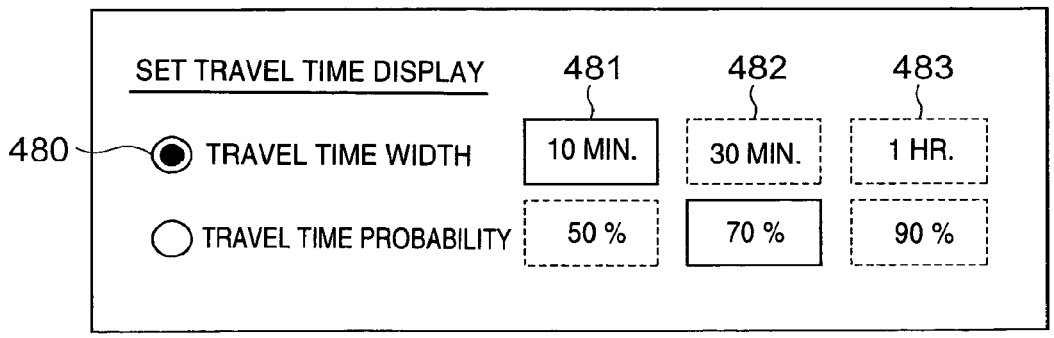
FIG. 14 shows an example of a screen for displaying and setting a travel time.

Explanation will then be made as to an example when an average travel time E, a travel time range E±ΔX for a specific route (target route), and a probability P (ΔX) of the travel time range are displayed on the user terminal 200, by using a flowchart of FIG. 13.

The information processor 202 first sets various values associated with the display of the travel time (step S1400). The various set values include a travel time range and a travel time probability (corresponding to the probability P of travel time range). The travel time range may be found and set by accepting selection of a travel time width (corresponding to twice the ΔX) indicative of the display width of the travel time and finding them according to the equation of travel time range E±ΔX. At this time, the information processor 202 displays on the screen 140 of the display 205 a radio button 480 to select one of the travel time width and the travel time probability is preferentially displayed as an index. Reference numerals 481 to 483 in the screen 140 denote candidate buttons for set values of setting items.

Next, the information processor 202 issues a request to the traffic information providing system 107 to cause the system to calculate a travel time (average travel time) for the target route, a probability distribution thereof, an expected value thereof, and a travel time probability for the set travel time range. The traffic information providing system 107 calculates these values according to the aforementioned method, and then transmits them to the information processor 202 of the user terminal 200 (step S1401). In this connection, the information processor 202 itself may calculate these values. The information processor 202 then decides whether or not a calculated result satisfies predetermined conditions (step S1402). The conditions are set as the maximum width (e.g., 60 minutes) of the travel time width and the lower limit value (e.g., 40%) of the travel time probability. When the set values exceed these conditions, this means that the information has a low reliability.

As a first example, when an average travel time of 45 minutes, a travel time range of 40-50 minutes, and a travel time probability of as highly low as 20% are calculated for the travel time width of 10 minutes, the lower limit (e.g., 40%) of the travel time probability fails to satisfy the above conditions. As a second example, when an average travel time of 55 minutes, a travel time probability of 90%, and a travel time range as highly wide as 10-100 minutes are calculated for the travel time probability set at 90%, the travel time width exceeds the maximum width (e.g., 60 minutes) of the travel time width, and thus the conditions are not satisfied. As a third example, even when the travel time width is set at 30 minutes, if the value of the average travel time becomes 10 minutes, then the travel time range becomes −5 minutes to 25 minutes. That is, the minimum value may be calculated as a value of zero or lower. Even in this case, the conditions are not satisfied. Similarly, even when the maximum value of the travel time range exceeds a predetermined value (e.g., 10 hours), the conditions are not satisfied. As in the above, when the conditions are not satisfied, the information processor 202 automatically modifies the travel time width or the travel time probability so as to meet the conditions (step S1403).

For instance, in the above first example, since it results in a travel time width set at 10 minutes with a low reliability, the information processor modifies the travel time width to a suitable value (e.g., 20 minutes). In the above second example, it results in a travel time probability set at 90% with a low reliability, the information processor modifies the travel time probability to a suitable value (e.g., 70%). When the minimum value of the travel time range is 0 or lower as in the above third example, the information processor changes only the upper limit value of the travel time range, for example, changes the maximum value of the travel time range to a maximum value (e.g., 25 minutes) or smaller. When the maximum value exceeds a predetermined value, the information processor changes only the lower limit value of the travel time range, for example, changes the travel time range to a minimum value (e.g., 550 minutes) or higher. And the information processor performs the calculating operation of the step S1401 on the basis of the changed set value, and repeats the operations of the steps S1401 to S1403 until the above conditions are satisfied. However, even after repeating the above operations a predetermined number of times, if the processor fails to obtain a result satisfying the above conditions, then the processor terminates the operation as no solution. And the information processor outputs a result last obtained to the display 205 (characters or figures) or a loudspeaker (voice) or the like (S1404).

Figure 15A:
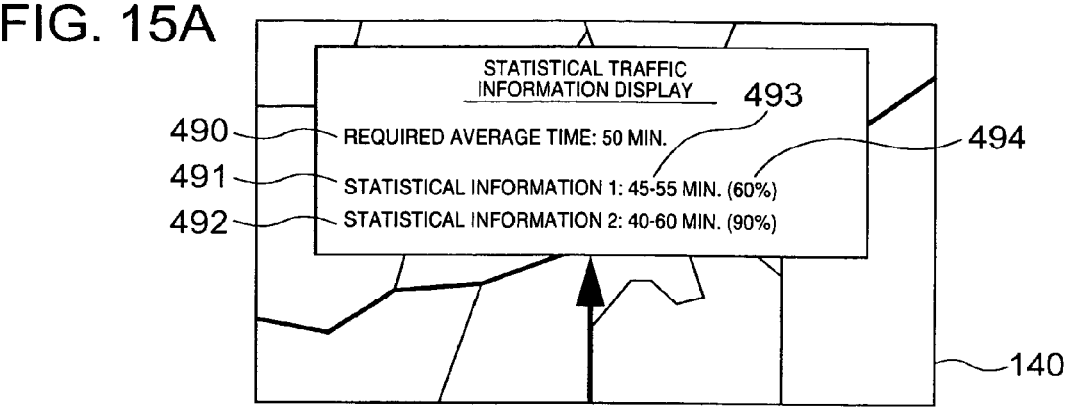
FIG. 15A shows an example of a screen for a travel time and a probability.
Figure 15B:
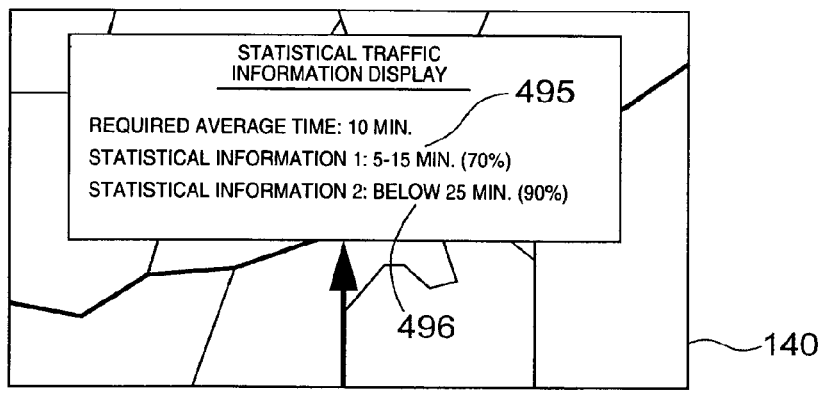
FIG. 15B shows an example of a screen for a travel time and a probability.
Figure 15C:
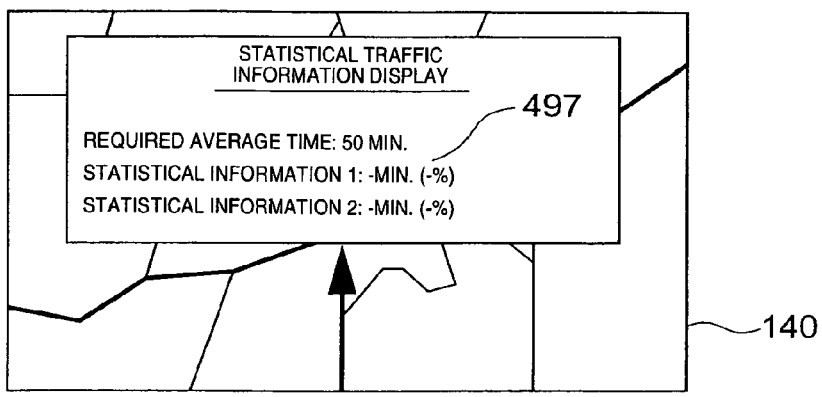
FIG. 15C shows an example of a screen for a travel time and a probability.

Screen display examples of the display 205 are shown in FIGS. 15A, 15B, and 15C. In FIG. 15A, reference numeral 490 denotes an average travel time (average required time) or a travel time expected value, numeral 493 denotes a travel time range, and 493 denotes a travel time probability. In FIG. 15B, reference numeral 496 shows an example when the travel time range is displayed only by its upper limit value because the minimum value of the travel time range is 0 or lower. In FIG. 15C, numeral 497 shows an example wherein the processor fails to obtain a solution satisfying the above conditions with a result of no solution. In this connection, the values of the travel time range and travel time probability may be displayed in the form of a stacked bar chart or a pie chart. With it, the user can intuitively know the car status even during driving.

Further, information (route information) such as travel times for a plurality of routes may be displayed. In this case, the route information can be displayed to be arranged in an ascending order of predetermined route types (e.g., in an order of shortest time route, expressway priority, and public road or non-expressway priority), or in an increasing order of travel time (in a younger order of estimated arrival time). Or the travel time range or the estimated arrival time range and the probability thereof may be displayed, and route information may be displayed to be arranged in an increasing order of the travel time expected values or in a decreasing order of the probability. In addition, a specific route and route information may be displayed on a map to be overlapped with the map. The embodiment of the present invention has been explained above.

In accordance with the present embodiment, even when traffic information externally received is not necessarily sufficient in the stability quality and information quantity, the system can accurately generate real-time traffic information, statistical traffic information, and predicted traffic information including a highly practical travel time range and a probability thereof, with respect to many links including links to which information is not provided, by statistically processing the traffic information.

In accordance with the present embodiment, further, since the travel time range of a route and the probability thereof are displayed, the user can intuitively know the arrival time width and a frequency thereof and can easily make a trip plan. In this way, there can be provided a car navigation system which has a good convenience of use.

The present invention is not restricted to the above embodiment, but may be modified in various ways without departing from the spirit and scope thereof. For example, the statistical traffic information DB may be stored in such a storage medium as CD, DVD, memory card or hard disk. When the user terminal 200 displays traffic information, part of the traffic information already estimated and complemented may be displayed to be distinguished from traffic information not complemented yet, as by using different display colors for these information.

The car navigation system of the present invention for creating traffic information to be used in the car navigation systems includes a traffic information acquiring means for externally acquiring traffic information including information about link travel time, and a complementing means for calculating traffic information about travel time by performing estimate/complement operation over a non-provision link to which information about travel time is not provided by the traffic information acquiring means. The complementing means may calculate an average travel speed of all links or links having the same road attributes as the non-provision link within a predetermined area in which the non-provision link is present, regard the calculated average travel speed as a travel speed of the non-provision link, and calculate a travel time for the non-provision link.

The traffic information providing system may include a storage means for storing traffic information acquired by the traffic information acquiring means; a statistical means for statistically processing past traffic information stored by the storage means; and a predicting means for predicting a travel time of a specific link after passage of a predetermined time with use of the current traffic information acquired by the traffic information acquiring means, the traffic information statically processed by the statistical means, and the traffic information calculated by the complementing means.

The car navigation system may include a means, in response to a request from the car navigation system, for molding the traffic information acquired by the traffic information acquiring means and the traffic information calculated by the complementing means to data having a predetermined format, and for transmitting the formatted data to the car navigation system.

A method for displaying traffic information in accordance with the present invention is employed in the traffic information providing system for creating traffic information to be used in the car navigation system. The method includes a step of externally acquiring traffic information including information on a link travel time, and a complementing step of calculating traffic information on a travel time by estimating and complementing a non-provision link to which the information on the travel time is not provided through the traffic information acquiring step.

Figure 16:
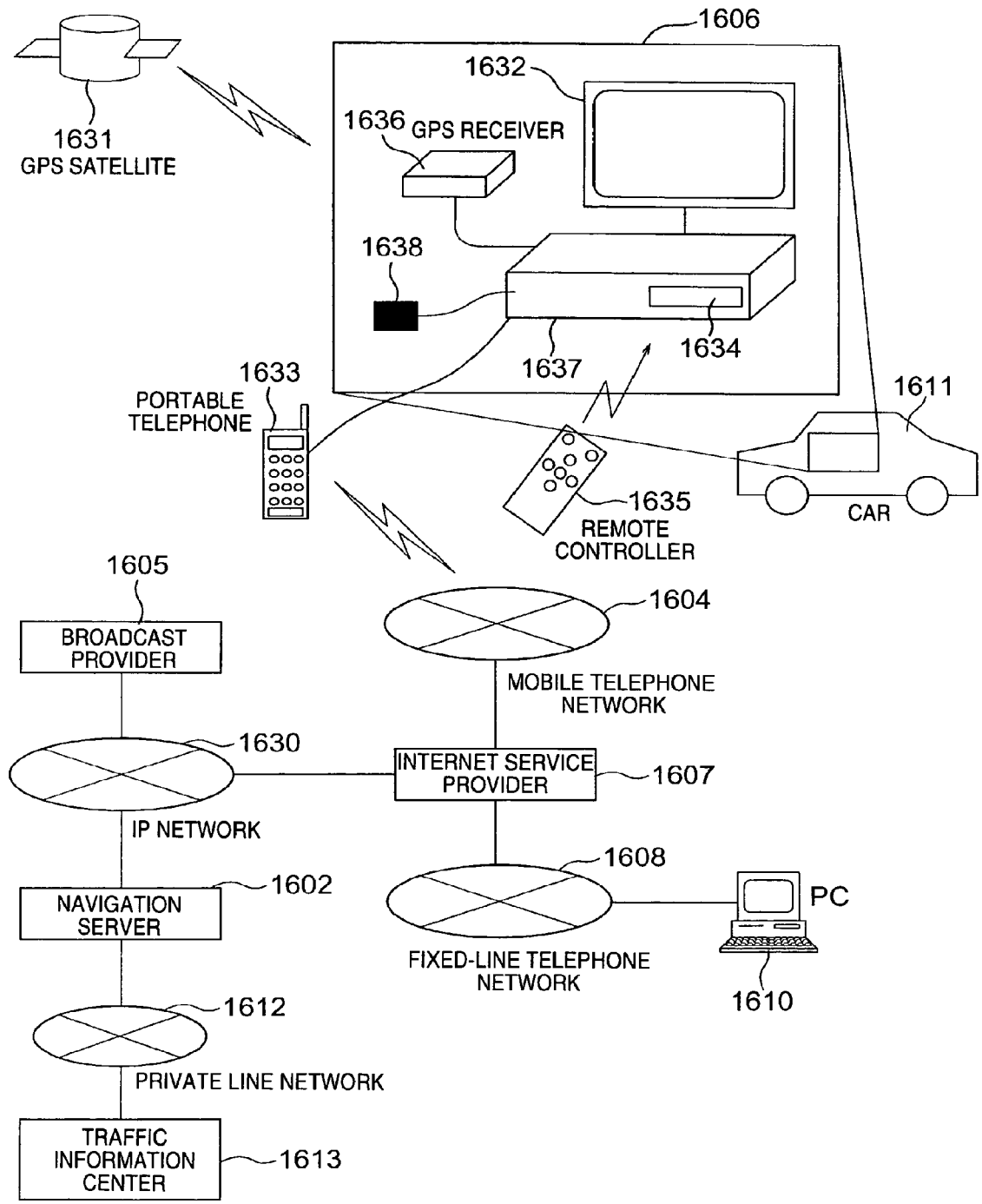
FIG. 16 shows a general system in accordance with another embodiment of the present invention.

Another embodiment of the present invention will next explained. FIG. 16 shows a general system in accordance with another embodiment of the present invention. The system includes a car terminal 1606 mounted on a vehicle 1611, a mobile telephone network 1604, an Internet service provider (which will be referred to merely as the provider, hereinafter) 1607, a broadcast provider 1605 for receiving data transmitted from communication/broadcast satellite and distributing the receive data to users via an IP network 1603, a navigation server 1602 for receiving and transmitting the distributed data from and to the provider 1607, a fixed-line telephone network 1608 connected with the provider 1607 for performing data transfer via the IP network 1603 or the mobile telephone network 1604, and a PC (Personal Computer) 1610 of a personal user. The navigation server 1602 is connected with a traffic information center 1613 via a private line network 1612.

The car terminal 1606 can obtain information by accessing the navigation server 1602 via the mobile telephone network 1604. Similarly, the PC 1610 can obtain information by accessing the navigation server 1602.

The navigation server 1602 has a route searching engine, map information, site point data such as restaurant and convenient store, traffic information, etc. The navigation server 1602, in response to a request from the car terminal 1606 or the PC 1610, searches for information and returns it thereto. The navigation server having, in particular, the route search engine, executes route searching operation when receiving a route search request from the car terminal 1606 or the PC 1610, returns its result thereto, and also stores the result in the navigation server 1602. The route searched result stored in the navigation server 1602 can be again used later. For example, the user issues a route search request from his home PC 1610 beforehand on the previous day. And when he rides in the car on the next day, he can download the previously-searched route from the car terminal 1606 and use it to guide the car.

Figure 17:
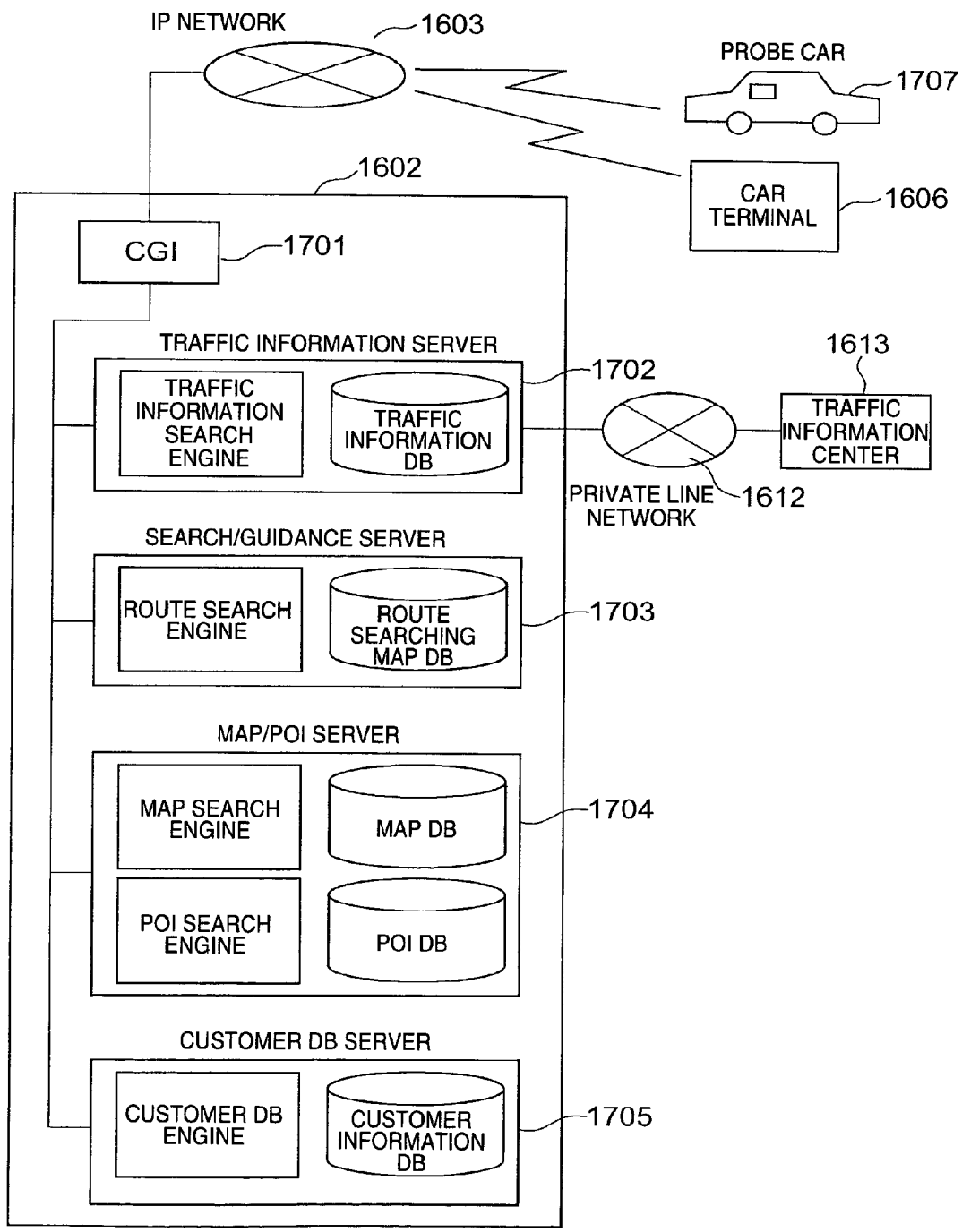
FIG. 17 shows a structure of a navigation server 1602.

FIG. 17 shows a detailed structure of the navigation server 1602. The navigation server 1602 has a CGI (Common Gateway Interface) 1701, a traffic information server 1702, a guidance server 1703 a map/POI (point of interest) server 1704, and a customer DB server 1705.

The navigation server 1602 receives longitude/latitude information about the car terminal 1606, moving speed information, moving direction, ID number, authentication password, the engine rotational speed of the vehicle 1611, and other parameters indicative of the status of the vehicle 1611, sent via the IP network 1603, as data relating to a request service. Thereafter, the navigation server authenticates the user at the CGI 1701. In response to user's request service, the navigation server sends data to any of the map/POI server 1704, guidance server 1703 and traffic information server 1702.

Each of the servers, when receiving the data, performs processing operation based on the received data, and transmits information about the user's request service to the car terminal 1606 via the CGI 1701, IP network 1603, Internet service provider 1607, and mobile telephone network 1604 (which route will be referred to as the communication network, hereinafter). Or when the reception of the information about the service becomes more expensive than broadcast, the navigation server transmits it to the car terminal 1606 via the CGI 1701, IP network 1603, broadcast provider 1605, and communication/broadcast satellite 1631 (which route will be referred to as the broadcast network, hereinafter).

Next, the function of each of the above servers will be explained. The traffic information server 1702, which processes traffic information, is provided with a traffic information search engine and a traffic information database. The server 1702 is also connected to the traffic information center 1613 via the private line network 1612. The traffic information server 1702 has a function of receiving traffic information distributed from the traffic information center 1613, processing the received data or transmitting the processed or not-processed data to the car terminal 1606.

The traffic information center 1613 has a function of collecting traffic information from all parts of Japan, and also a function of distributing traffic information. Generally speaking, car sensors are installed along a road at intervals of a certain distance, and the presence or absence of a congestion on the road is decided depending on the detected states of the sensors. Or the presence or absence of a congestion may be decided on the basis of speed information uploaded from a probe car 1707 running along the road. Information distributed from the traffic information center 1613 include information about congestion, restrictions, parking lot, service area (SA), and parking area (PA). The traffic information server 1702 distributes traffic information about the vicinity of the car terminal 1606, or searches for traffic information on the route or about the vicinity of the route on the basis of the route searched result, by processing such information. It goes without saying that the traffic information server also can search traffic information about the vicinity of a desired site point and distribute it.

The search/guidance server 1703, which calculates route/guidance information, is provided with a route search engine and a map DB for route searching. After the user authentication of the CGI 1701, on the basis of departure position information, goal position information, search information and other option data sent from the car terminal 1606, the route search engine creates a route coordinate point array and guide point information by referring to information in the route searching map DB. The searching conditions are information associated with route searching conditions of, for example, utilizing expressway as frequently as possible, using non-expressway or public roads as frequently as possible, or preferentially finding a route requiring a shortest time. A route to be calculated depends on the searching conditions.

The searched route result is stored in the customer DB server 1705, and, when the navigation server receives an on-route traffic information request from the car terminal 1606, the information is acquired or referred to from the traffic information server 1702. This is intended also to cope with the situations when a route re-transmission request is issued from the car terminal 1606 or when the route information is divided into small pieces of data and then distributed little by little. As a result, when the quantity of the searched route data is large, the data can be divided into small pieces of data and then distributed little by little.

The map/POI server 1704 functions to manage display map, POI information, etc to be distributed to the car terminal 1606. The server also has a function, when the navigation server receives a request from the car terminal 1606 to download a POI (point of interest) or a map, of clipping the POI or map according to the request parameter and returning it to the car terminal. The POI information is used to be set as a goal position for route searching or to distribute information about facilities in the vicinity of the car. The POI information includes information about, e.g., restaurant, convenient store, bank, etc. The POI information includes at least the title and latitude/longitude of a facility. The POI information may include, in addition to the above information, for example, information about telephone number, address, comment character string, photograph, etc for a facility.

The customer DB server 1705 is used to store information on customers. Stored in the server are not only private information about customers but also an access history from the car terminal 1606 and a searched route for each user. The route information includes at least information about the route point array and guide point. When route link information is previously stored, it can be used for extracting traffic information on the route. The customer DB server 1705 can be used to register a new user, delete registration, change registered contents, confirm registered contents, search for charge information of access fee, confirm the charge information, and so on, as services.

The structure of the car terminal 1606 in the present embodiment will be explained. The car terminal 1606 has a display 1632, a GPS (Global Positioning System) receiver 1636, a main body 1637, a memory card slot 1634, a portable telephone 1633, a remote controller 1635, and a microphone 1638. The display 1632 is a device which can display graphics and which is predominantly of a liquid crystal type. The GPS receiver 1636 is a device which receives a position measurement signal and calculates a coordinate position of the car terminal 1606. Incorporated in the main body 1637 are a CPU, a memory, a power source, and a unit for graphics display. The portable telephone 1633 is a device for communicating with an external device, that is, for transmitting or receiving data to or from the aforementioned navigation information provider. The remote controller 1635 is used for the user to transmit desired operation information to the car terminal 1606 using a button or buttons thereon. If necessary, the user also can transmit a command to the car terminal by voice using the microphone 1638.

The memory card slot 1634 is used to store data received from the navigation server 1602 or to load past-downloaded information into the car terminal 1606, by loading an external memory into the slot 1634. A memory card to be loaded into the memory card slot 1634 can be used merely as a storage or be used to authenticate user information for receiving communication or broadcast information. For example, when a vehicle carrying the car terminal 1606 thereon is such a car as a rentacar which can be used by many people, the user can use the service by inserting a memory card having authentication information written therein into the memory card slot 1634. And if the memory card has an upper limit money amount for the service previously set therein, the user can use the service within the limit of his estimated expenditure.

When the user previously downloads information about a departure position and a map in the vicinity thereof into the memory card, he can store labors from downloading the map from the navigation server 1602 in the initial state. Further, when the service once used by the user is previously written in the memory card, uploaded to the navigation server 1602 at constant intervals, and analyzed by the navigation server 1602; information according to his preference can be distributed.

In the aforementioned arrangement, the portable telephone 1633 has been used as a communication device. However, the portable phone may be replaced with another communication device, a PDA (Personal Digital Assistance), or a modem integrally built in the main body 1637. In place of the portable telephone 1633, an in-car LAN (Local Area Network) may be connected. In place of the GPS receiver 1636, further, position identifying service based on PHS (Personal Handyphone System) may be used.

The aforementioned arrangement is assumed for the car terminal 1606 to receive data via the communication network. In addition to it, however, a receiver capable of receiving broadcast wave from the communication/broadcast satellite, broadcast wave based on terrestrial digital broadcast, or broadcast wave using FM wave, as well as a device for decoding the received data can be attached to the main body 1637.

The aforementioned arrangement is designed to receive and transmit data from and to the navigation server 1602 via the communication network. When the arrangement is designed to perform data transfer using broadcast media, an interface with an antenna, a decoder, etc are required to receive broadcast information.

Figure 28:
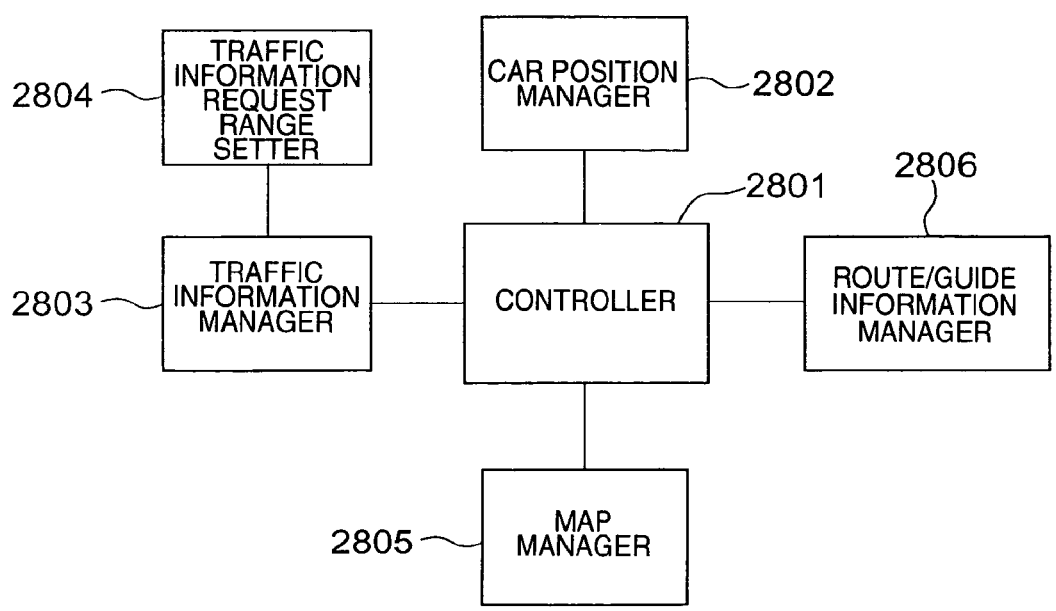
FIG. 28 shows a configuration of modules in a navigation application.

Explanation will be made as to the structure of a car navigation application program (which will be abbreviated merely to the navigation application, hereinafter) which operates on the car terminal 1606, by referring to FIG. 28. The navigation application has, as its functional modules, a controller 2801, a car position manager 2802, a traffic information manager 2803, a traffic-information request range setter 2804, a map manager 2805, and a guide information manager 2806.

The controller 2801 is a module for controlling a flow of the operation of the navigation application. The car position manager 2802 is a module for analyzing a signal from the GPS receiver 1636 and managing the position of the car on the map. In this connection, the signal from the GPS receiver 1636 is not always overlapped with a road on the map. To avoid this, the car position manager 2802 performs correcting operation by a technique called map matching to cause the car position to be located on a road of the map.

The traffic information manager 2803 is a module for managing traffic information downloaded from the navigation server 1602. The downloaded traffic information refers to at least traffic information about on a route or the vicinity of the route or traffic information about the vicinity of a desired point. The traffic information manager 2803 manages the type, downloaded time, etc of the downloaded traffic information. The traffic information manager 2803 operates cooperatively with the traffic-information request range setter 2804.

The traffic-information request range setter 2804 is a module, when traffic information is downloaded from the navigation server 1602, for determining a range of information to be downloaded. The range determining method includes a method for the user to enter a range to be downloaded, a method for the user to select among from conditions set as default in the car terminal 1606, and a method for the user to grasp the status of resources (such as a available or usable space left in the storage, and an information transmission capability via the mobile telephone network 1604) of the car terminal 1606 and decide the range.

The map manager 2805 is a unit for managing map data stored in the car terminal 1606. The manager manages at least the level (detail level) of the stored map, range and version.

The guide information manager 2806 is a module for managing route/guidance information stored in the car terminal 1606. The guide information manager 2806 has a main function of managing route/guidance information downloaded from the navigation server 1602. When the navigation application itself has a route search engine, however, the manager 2806 also can mange route/guidance information output from the route search engine of the navigation application. Information to be managed by the guide information manager 2806 includes at least information about route point array and guide point. In addition, the manager 2806 also can route link information. The guide point information includes at least information about guide point coordinate and guide direction. In addition, the guide point information may includes information about, enlarged intersection map, approach lane and guide point title.

Figure 18:
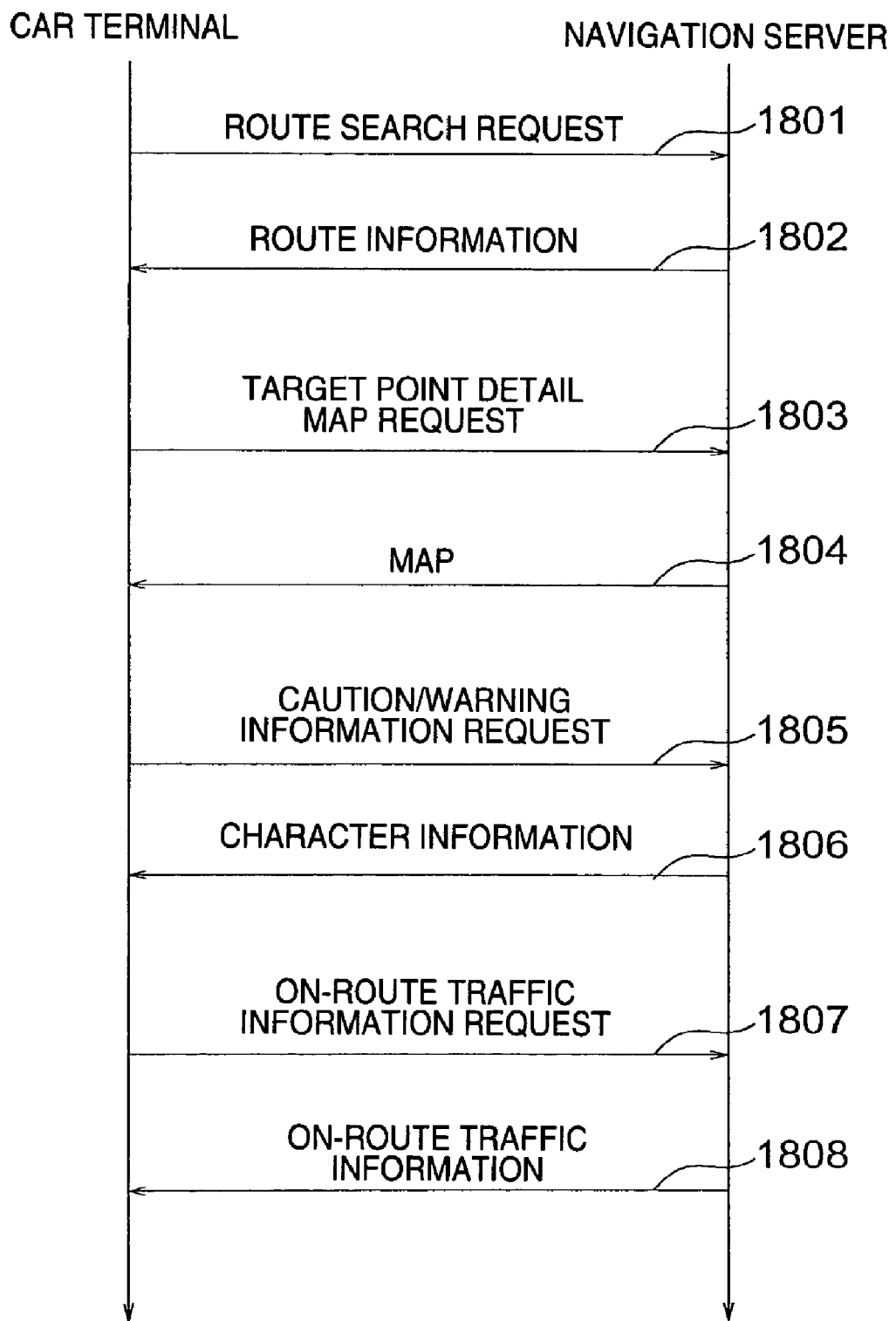
FIG. 18 is a communication sequence chart between a car terminal 1606 and the navigation server 1602.

FIG. 18 is an example of a sequence of data communication between the car terminal 1606 and the navigation server 1602 to obtain traffic information on a route. First of all, the car terminal 1606 issues a route search request to the navigation server 1602 (1801), and receives route information (1802). The route information has route point array and guide point. The car terminal 1606 next issues a request to the navigation server 1602 to obtain a detailed map in the vicinity of a target position (1803) and downloads it (1804). However, this is executed only when the car terminal 1606 has no such detailed map around the target position. If such a map is already stored in the memory card or previously downloaded, then the map downloading is unnecessary.

Next, for the purpose of downloading emergency message information, the car terminal 1606 issues a caution/warning information request (1805) and downloads the character information (1806). Since the emergency message contains information about an act of God, an incident, etc, it is desirable to download the emergency message information faster than other traffic information and to display it on the car terminal 1606. Finally, the car terminal issues a request to obtain on-route traffic information other than the emergency message (1807) and downloads it (1808). Although the requested information is described as the 'on-route traffic information' in FIG. 18, the requested traffic information may contain traffic information about the position of the car or about the vicinity of a desired point.

Traffic information contains, in addition to congestion or restriction information, character information to inform the user of the emergency message. Of course, the traffic information may be collectively downloaded regardless of such types or only the emergency message may be first downloaded as shown in FIG. 18. However, even in the case of the collective download, when the information contains the emergency message, it is desirable to display the emergency message preferentially.

Figure 19:
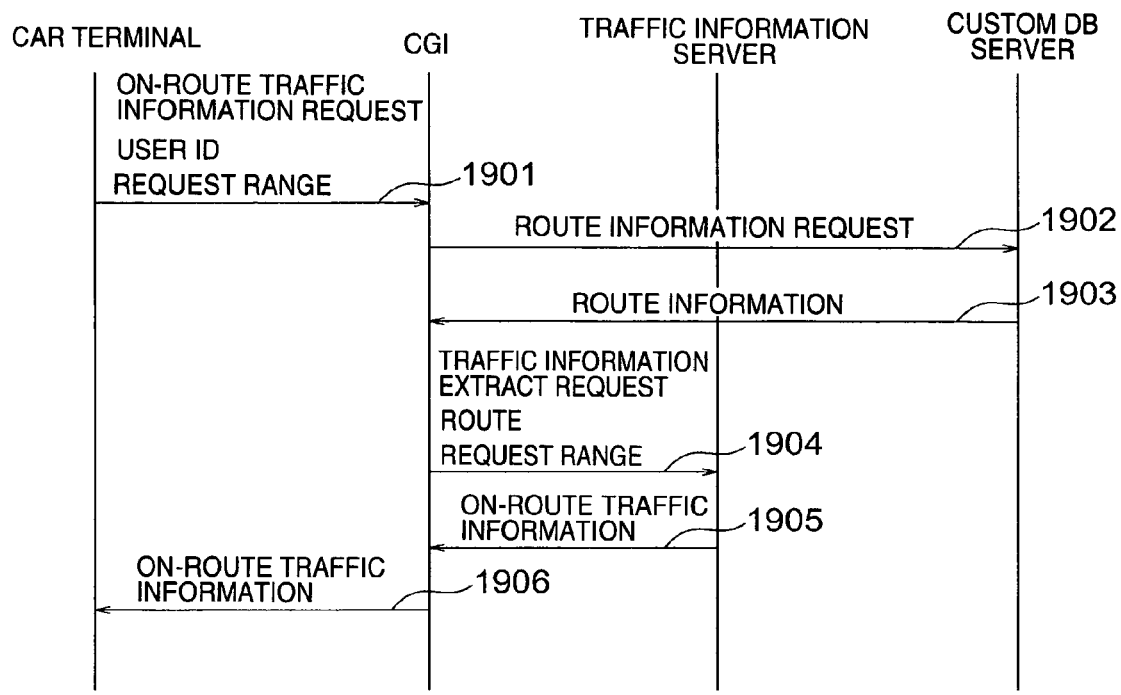
FIG. 19 is a sequence chart when on-route traffic information is downloaded.

FIG. 19 shows a sequence of communication between the car terminal and each server of the navigation server when on-route traffic information is downloaded. As mentioned above, the range of traffic information to be downloaded is not limited to the on-route information, but may be traffic information about the vicinity of the position of the car or the vicinity of a desired point, or about on-route and the position of the car or the vicinity of a desired point.

The car terminal 1606, when issuing a request about on-route traffic information to the navigation server 1602, uploads an user ID and a request range to the navigation server 1602 (1901). With respect to the range of the traffic information, at least following methods (1) to (6) can be specified therefor.

(1) A range between n-th and m-th sections in a route.
(2) A range on a route through which the car passes after passage of n minutes from the position of the car.
(3) A range on a route between the position of the car and a point n km ahead of the car position.
(4) A range on a non-passage route having a traffic information size of n bytes or less.
(5) A range corresponding to all the sections of a non-passage route.
(6) A range between two points on a route.

Such a range specifying method may be stored previously in the car terminal 1606, may be specified by the user each time traffic information is downloaded. Or only one of the aforementioned methods may be specified or a plurality of combinations thereof may be specified.

The method (1) is when a section range on a route is specified. In this case, the word 'section' as used therein refers to at least a distance between guide points or any one of divisions of a route divided by a constant distance. Selection of the above may be specified when the route link information is downloaded from the car terminal 1606, or may be previously specified in both of the navigation server 1602 and car terminal 1606. In the method (1), on-route traffic information corresponding to the range requested by the car terminal 1606 is distributed regardless of the position of the car.

The above method (2) is when a time range is specified, and the time range is calculated according to the type of a road along which the car will run. The calculation is carried out by changing the car speed according to the road type, for example, assuming that the speed is 80 km/h on expressway and is 30 km/h on non-expressway or public road. When a time range of passage of 30 minutes or less from now is uploaded from the car terminal, calculation is carried out about traffic information about a section from the current position to a point 40 km away therefrom on the expressway road and about a section from the current position to a point 15 km away therefrom on the non-expressway or public road, assuming the above speed requirements. In this case, it is necessary to transmit information about the position of the car from the car terminal 1606 to the navigation server 1602. In this connection, the value of "30 minutes" in the above may be changed to another value, or may be changed to a constant stored in the server 1602.

The above method (3) is when a range of distance from the position of the car is specified, in which case the position of the car and a value 'n' are uploaded from the car terminal 1606 and the server 1602 searches for on-route traffic information in the range. However, as the value 'n', a fixed value set in the server 1602 may be employed.

The above method (4) is when the size of information to be received is specified. In this case, an upper limit data size may be transmitted from the car terminal 1606, or the data size may be previously determined by the navigation server 1602. When the method (4) is employed, it is required to transmit the car position from the car terminal 1606 to the navigation server 1602. When the data size is transmitted from the car terminal 1606, the data size may be determined by the car terminal 1606, e.g., according to communication speed, the usable memory size of the car terminal 1606, and so on. Or the usable memory size of communication speed of the car terminal 1606 may be transmitted to the navigation server 1602, and the data size may be correspondingly determined by the navigation server 1602.

The above method (5) is when a range on a route along which the car does not run yet, is specified. In this case, it is only required to transmit the car position from the car terminal 1606 to the navigation server 1602. The car position can be expressed in the form of a coordinate point, a own car position section, etc. The car position section refers to a section in which the car is currently located. When the car position is expressed by a coordinate point, the navigation server 1602 can convert the coordinated point to a own car position section and provide traffic information about sections between the car position section and the end point of the route. However, the method (5) is not necessarily required. For example, the method (5) can be made unnecessary by specifying the section between the car position and the end point of the route in the method (1).

The above method (6) is when a range between any two points on a route. In this case, the range between the two points on the route is transmitted from the car terminal 1606 to the navigation server 1602 to acquire traffic information about the range on the route. As in the above (5), the two-point range may be expressed by coordinate points, a own car position section or the like.

In ones of the above 6 methods which requires the car position to be uploaded from the car terminal 1606 to the navigation server 1602, the car position is not always placed on the route due to the accuracy of the car terminal 1606. Accordingly, it is required for the car terminal 1606 or navigation server 1602 to correct the coordinate point in such a manner that the point is on the route.

Whether to use which of the above parameters can be determined by the user who enters a selection command on the display screen. The parameter setting screen appears when the user selects a menu on the start screen, the parameters of the methods (1) to (6) are arranged on the screen, and the user specifies desired one of the parameters by pushing or clicking a corresponding radio button. When a distance from the car positions is specified, a distance specifying screen appears. On the distance specifying screen, for example, the user can set a distance range by specifying a distance for each of expressway and non-expressway roads.

The above parameters have default values on the side of the car terminal 1606. For example, for the parameters of the above methods (2), (3), and (4), default values can be previously set when the car is on the non-expressway or public road and when the car is on the expressway road. In the case of parameters of the above method (2), with respect to a range through which the car passes through in 'n' minutes, a range for the expressway road should be longer than a range for the non-expressway road. In the case of parameters of the above method (3), it is desirable to set to set a default value for the expressway road to be longer than a default value for the non-expressway road. The same holds true even for the method (4).

When receiving a on-route traffic information request from the car terminal 1606 via the CGI 1701, the navigation server 1602 stores user's access history in the customer DB server 1705. Thereafter, the traffic information server 1702 searches for traffic information in a range specified by the car terminal 1606.

More specifically, when the on-route traffic information is required (1901), this means that the car terminal requires route information about the user stored in the customer DB server 1705 (1902), and in response to it, the navigation server extracts the corresponding route information from the customer DB server 1705 (1903) and requires the traffic information server 1702 to extract traffic information by specifying a route and a request range (1904). The traffic information server 1702 searches for traffic information matching with the sent route and request range and sends on-route traffic information to the CGI 1701 as a response (1905). The CGI 1701, when receiving the searched result, returns the result to the car terminal 1606 (1906).

In this connection, it is not necessarily required to extract route information from the customer DB server 1705, and in the case of a traffic information request, route information in the form of link can be uploaded from the car terminal 1606. In other words, upon transmitting route information to the car terminal 1606, when the system is designed to transmit not only route point array information but also route link information together, the need to store route information in the customer DB server 1705 can be eliminated and the need for the navigation server 1602 to extract route information also can be removed. When the car terminal 1606 has a route searching function, the terminal generates route link information. Thus the terminal can upload the route link information to the navigation server 1602. Accordingly, this function can be used even when the search/guidance server 1703 or the customer DB server 1705 is not provided.

Figure 20:
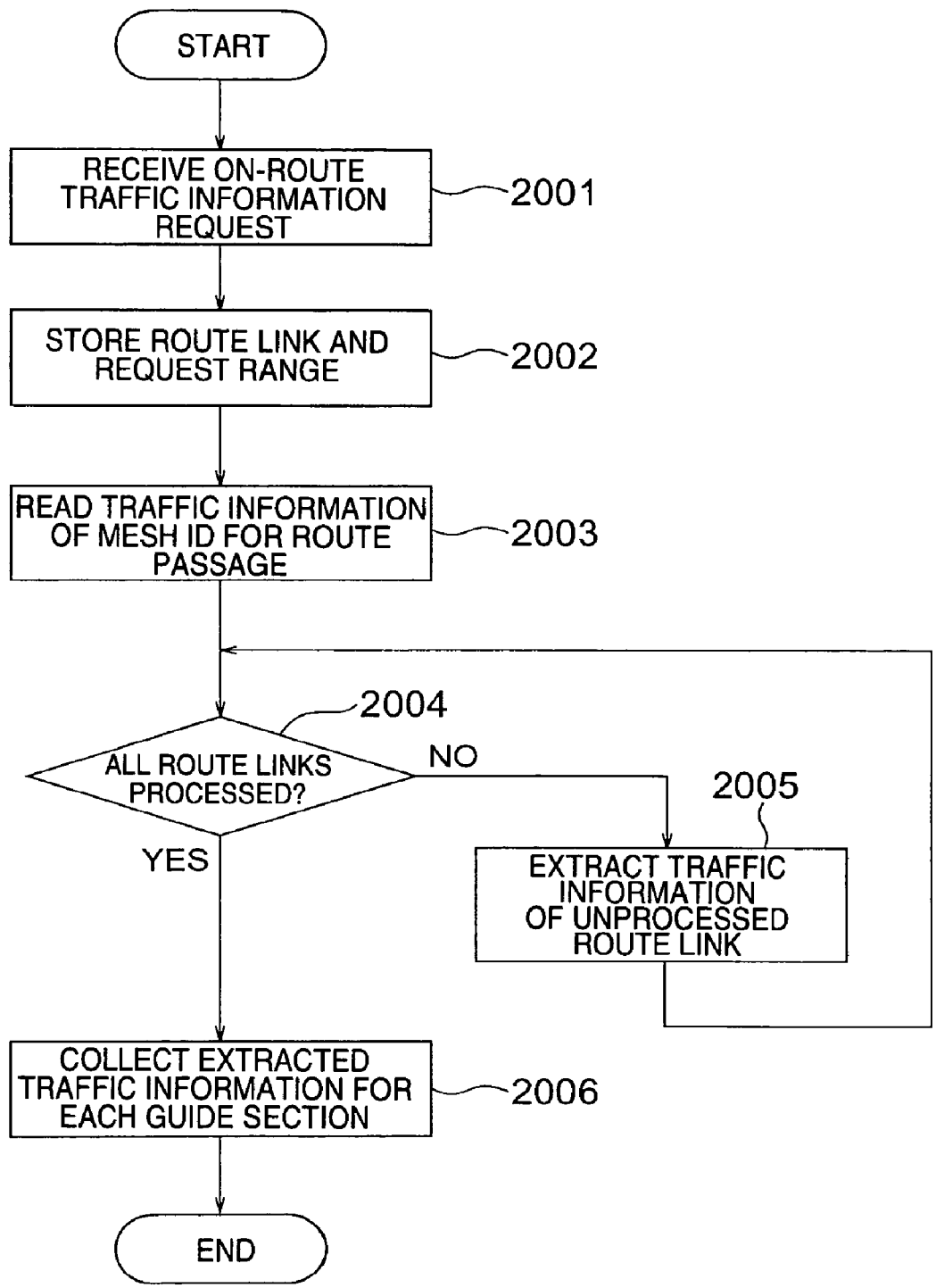
FIG. 20 is a flowchart showing the on-route traffic information extracting operation of the traffic information server 1702.

The operation of the navigation server 1602 for extracting on-route traffic information will be further explained with use of FIG. 20. FIG. 20 is a flowchart for explaining the operation of the traffic information server 1702 for extracting on-route traffic information. The traffic information server first receives a request (1904) of on-route traffic information extraction from the CGI 1701 (step 2001). At this time, since the traffic information server also receives route link information and a traffic information request range together, the server stores these information in the memory (step 2002).

The traffic information server next searches for map mesh on which the route is extended and reads traffic information on the map mesh. In this case, it is assumed that the traffic information server 1702 receives traffic information from the traffic information center 1613 at regular intervals, and previously stores the traffic information in the traffic information DB of the traffic information server 1702 in the form of a file for each map mesh and each information type. For the name of the file any title can be used. For easy understanding of the mesh ID and information type of the file, however, the mesh ID can be used as the file name and the information type can be used as the extension. Or information from the probe car 1707 may be stored in the traffic information DB of the traffic information server 1702 and may be used for the above purpose.

Next, the traffic information server 1702 processes all ones of links of the sent route which are included in the request range of the traffic information (step 2004), and searches for traffic information about route links not processed (step 2005). The searching of traffic information can be realized by matching the link ID included in the route link information with the link ID included in the traffic information. After complementing the operation of the step 2005 about all route links included in the request range, the traffic information server finally collects traffic information for each guidance section (step 2006). The word "guidance section" as used herein refers to a row of route links between guide points. The collecting operation is not always necessary. For example, in the case where the car terminal 1606 has route link information, even when traffic information for each link is sent to the car terminal 1606, the collecting operation can be carried out by the car terminal 1606.

When the car terminal has route link information, however, in order to avoid mismatching between link information, the information is required to be based on the route searching map DB of the search/guidance server 1703. To this end, when route link information is sent from the car terminal 1606 to the navigation server 1602, map format and version may be sent together with the route link information. That is, the navigation server 1602 performs the operation when the map format and version coincide with those of the route searching map DB. When a coincidence is not found, an error code is sent from the navigation server 1602 to the car terminal 1606*s*. Or the route link held in the car terminal 1606 also may be based on link information based on a VICS (Vehicle Information and Communication System). With it, the navigation server 1602 and the car terminal 1606 have the same link information without mismatching between links. In this connection, it is desirable to make the version of the link to coincide with the version of the link of the VICS.

Figure 21:
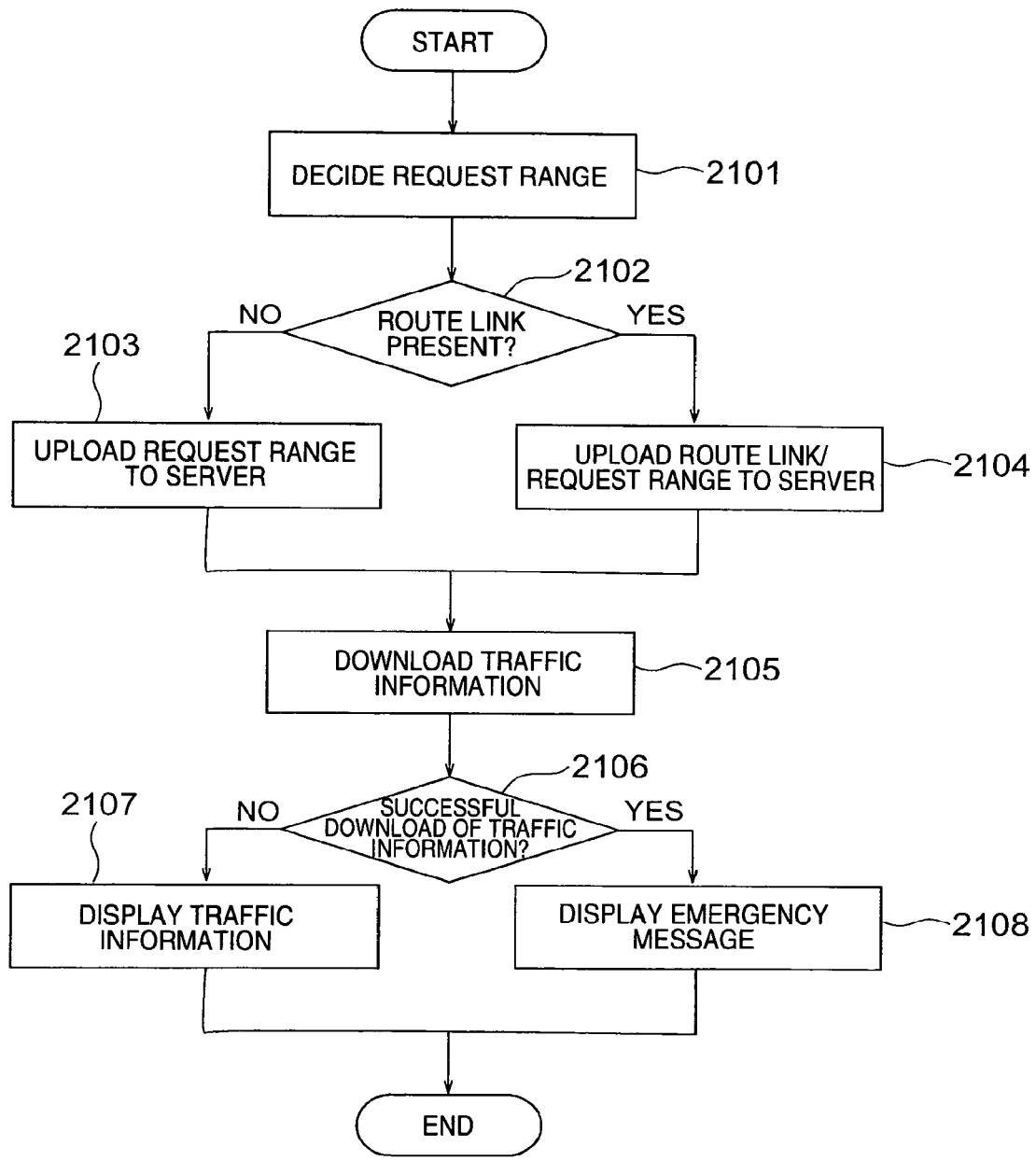
FIG. 21 is a flowchart showing the on-route traffic information displaying operation of the car terminal 1606.

The extracting operation of on-route traffic information as viewed from the car terminal 1606 will be further explained by referring to FIG. 21. In a step 2101, first, a range on a route requiring traffic information is set. This is carried out by accepting a range specified, e.g., according to the methods (1) to (6).

The car terminal 1606 next confirms whether or not route link information is present in the car terminal (step 2102). When route link information is present in its own terminal, the car terminal transmits the route link information to the navigation server 1602 together with a request range upon transmitting a traffic information request thereto (step 2104). When route link information is absent in its own terminal, the terminal transmits only the request range to the navigation server 1602 (step 2103).

After issuing the request to the navigation server 1602, the car terminal waits for completion of the operation of the navigation server 1602. When the operation of the navigation server 1602 is completed and the car terminal 1606 receives a response from the navigation server 1602, the terminal downloads traffic information from the navigation server 1602 (step 2105). After the terminal successfully downloads traffic information, the terminal displays the received traffic information on the display 1632 (step 2107). If the downloading of the traffic information ends in a failure for some reasons, the terminal displays an error message on the display (step 2108).

Figure 22:
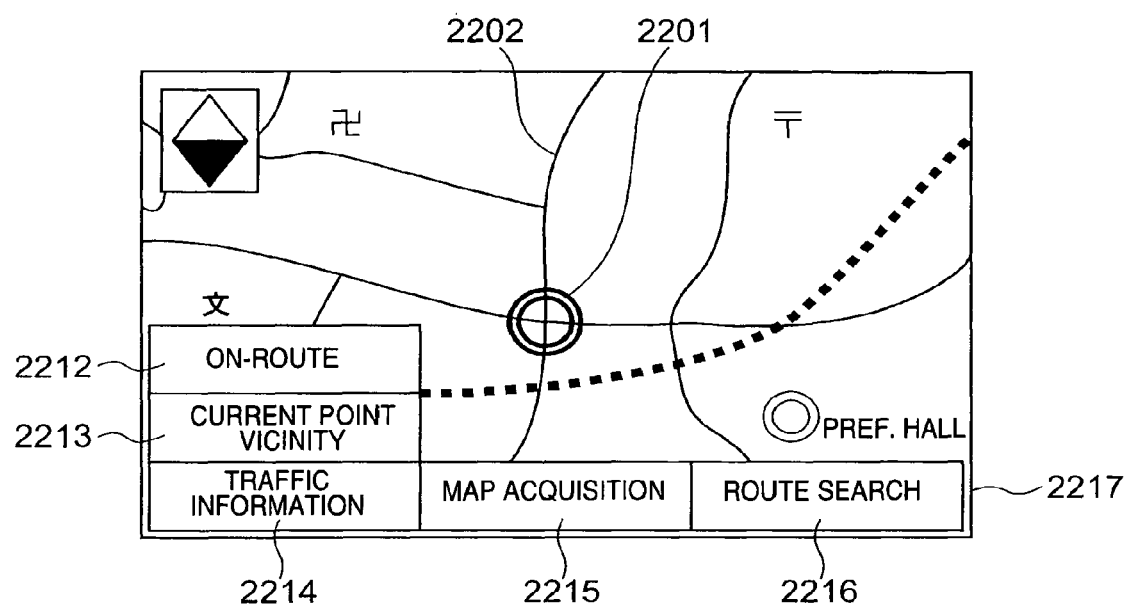
FIG. 22 shows an example of a screen on which a main menu is displayed.
Figure 23A:
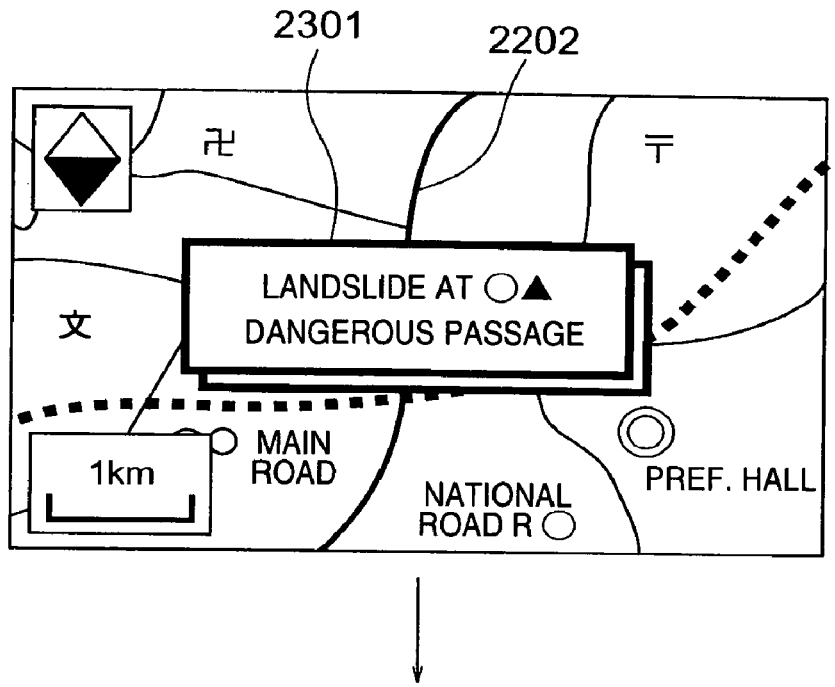
FIG. 23A shows an example of a screen on which an emergency message is displayed.
Figure 23B:
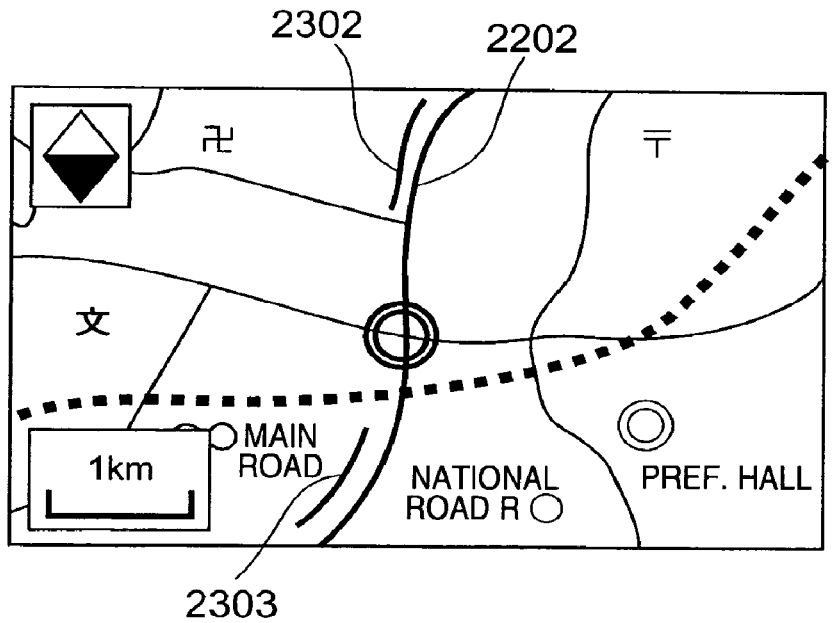
FIG. 23B shows an example of a screen on which traffic information other than the emergency is displayed.

The screen transition for the downloading of traffic information will be further explained with use of FIGS. 22, 23A, and 23B. As shown in FIG. 22, a car position 2201 and a route 2202 are displayed on the screen. Under this condition, when the user operates the remote controller 1635 or clicks any of buttons in the screen, a menu appears. A main menu 2211 is displayed in the lower part of the screen of FIG. 22. The main menu 2211 is made up of a traffic information menu 2214, a map acquisition menu 2215, and a route search menu 2216. When each menu is selected, a submenu further appears. In the case of FIG. 22, the traffic information menu 2214 is selected from the main menu 2211, so that a 'on-route' submenu 2212 and a 'current position vicinity' submenu 2213 are displayed. When the user selects the 'on-route' submenu 2212 from the traffic information menu 2214, this causes the terminal to start downloading on-route traffic information.

When the user selects the 2212, the car terminal 1606 is connected to the navigation server 1602 to download on-route traffic information. Before the terminal receives on-route traffic information back from the navigation server 1602, the display of all the menus once disappears and a message saying "acquiring traffic information" appears as overlapped with the map. In this connection, it is also possible not to display the map and to display only the message. When the connection of the terminal with the navigation server ends in a failure for some reasons, a message saying "server connection failed" appears.

When the connection with the navigation server is successful, the navigation server 1602 extracts on-route traffic information. When receiving the on-route traffic information from the navigation server 1602, the car terminal 1606 displays the received traffic information on the screen. Before the car terminal car terminal 1606 displays the received traffic information, the terminal confirms the presence or absence of emergency information in the downloaded traffic information. In the case of the presence, the terminal displays the emergency information. FIG. 23A displays the emergency message and FIG. 23B displays traffic information other than the emergency message. When emergency information is included in the downloaded traffic information, the screen of the FIG. 23A appears, showing an emergency message 2301.

After the emergency information is displayed, if the terminal detects that the remote controller 1635 was operated or a confirm button (not shown) given in one side of the screen was clicked by the user, then congestion information 2302 and 2303 other than the emergency information appear as shown ins FIG. 23B. In this case, when the display 1632 of the car terminal 1606 is equipped with a touch panel, the confirm button can be provided on the screen. Or even in the case where the confirm button is not clicked, when a predetermined timeout set time elapses after the display of the emergency information and the terminal detects the timeout, the terminal erases the emergency message 2301 and displays other traffic information (e.g., the congestion information 2302 and 2303 other than the emergency information). In this connection, the switching of the display from the emergency information to other information due to the timeout may be carried out in an arbitrary manner, and the emergency information may be continuously displayed until the user clicks the confirm button. In the absence of the emergency information, after the car terminal downloads traffic information, the terminal displays traffic information other than the emergency information. This operation is intended to preferentially display the emergency information to be notified first to the user. For example, when a traffic suspension takes place on a road along which the vehicle 1611 now proceeds due to an accident or calamity, the traffic suspension information should be informed preferentially to the user to other congestion restriction information, etc. Such information as to have a high emergency is preferentially displayed.

In a method for extracting information having a high emergency from the traffic information downloaded by the car terminal 1606, for example, attribute information indicative of emergency information is previously attached in the navigation server 1602 and only information having such an emergency information attribute is regarded as emergency information. Or even information having no emergency information attribute can be determined as emergency information by the car terminal 1606. For example, when an accident or calamity occurs and the driver of the car can judge it as dangerous, even information having no emergency information attribute in the navigation server 1602 can be preferentially displayed by the car terminal 1606.

Although the congestion information 2302 and 2303 are displayed as shifted slightly from the route 2202 in the present embodiment, the congestion information and the route may be differently colored and the congestion information may be displayed to be overlapped with the route.

Further, the emergency message 2301 is displayed and thereafter the congestion information 2302 and 2303 are displayed in the present embodiment. However, the present invention is not limited to the display in the above order, but these traffic information may be simultaneously displayed, the system may wait for the clicking of the confirm button or for a timeout, after which the congestion information 2302 and 2303 can be left and the emergency message 2301 can be erased.

The downloading of the on-route traffic information is not restricted to the case where the user selects the on-route traffic-information download menu and downloads explicitly. When the car terminal 1606 has route information and the user wants to download traffic information about the vicinity of the current position of the car, the user can download traffic information together with on-route traffic information. This is intended to mismatching between the traffic information about the vicinity of the current car position and the on-route traffic information. Even in this case, however, a range of the on-route traffic information to be acquired is set, and the setting is carried out in the same manner as in the aforementioned embodiment.

Figure 24:
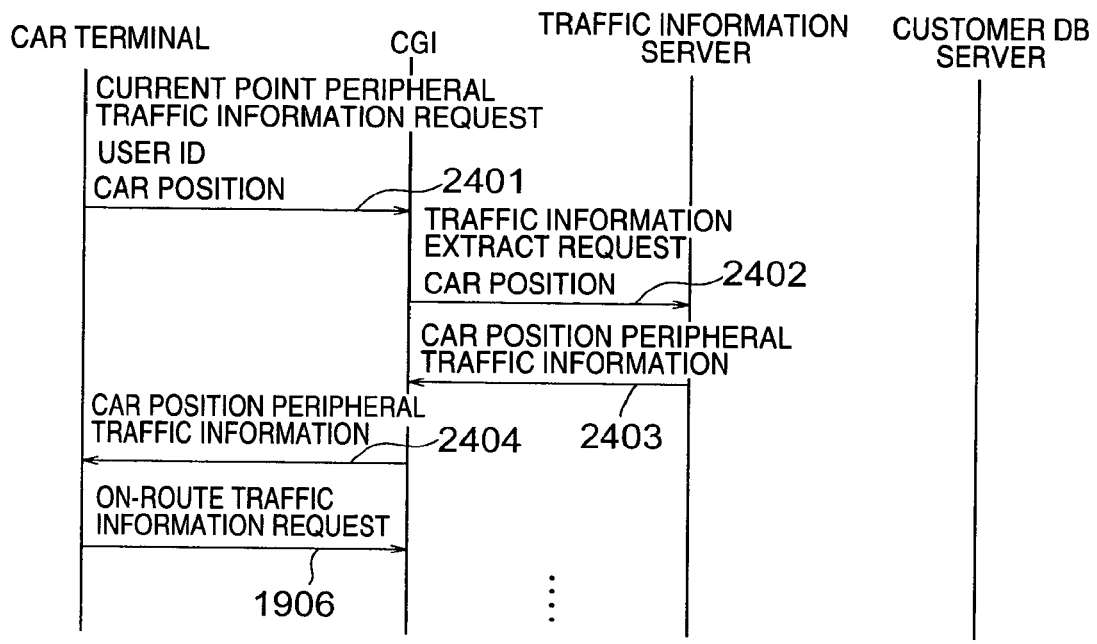
FIG. 24 is a sequence chart when traffic information about the vicinity of the position of the car is downloaded.

FIG. 24 is a sequence chart when traffic information about the vicinity of the position of the car is downloaded. The car terminal 1606 first transmits a request of traffic information about the vicinity of the car position together with the car position to the CGI 1701 (2401), and the CGI 1701 in turn requests the traffic information server 1702 to send the traffic information about the vicinity of the car position (2402). The traffic information server 1702 extracts the requested traffic information and returns the extracted information to the CGI 1701 (2403). The CGI 1701 then returns the received information to the car terminal 1606 (2404).

Subsequently, the car terminal 1606 transmits a on-route traffic information request to the navigation server 1602 (1906). The subsequent operations are as already explained in connection with FIG. 19. In this way, when the car terminal 1606 downloads traffic information about the vicinity of the car position, as soon as the car terminal accepts the car position vicinity information from the CGI, the terminal automatically transmits an on-route traffic information request to the CGI to acquire traffic information about a section of the route through which the car does not pass yet. In the above operations, the terminal requests the car position vicinity traffic information and the on-route traffic information separately from the navigation server 1602. However, Such two types of requests may be first requested, and the car position vicinity traffic information and the on-route traffic information may be separated received from the CGI. Further, the CGI may respond to the car terminal by collecting the two types of traffic information into a single piece of information.

Figure 25:
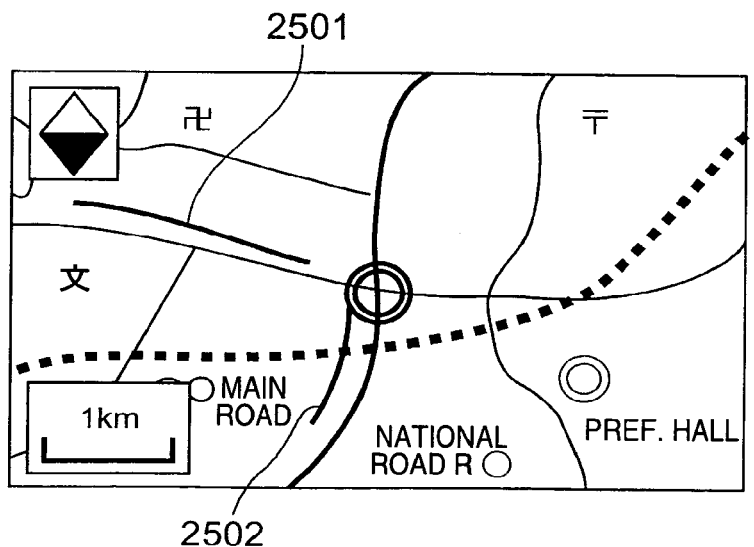
FIG. 25 shows an example of a screen on which traffic information is displayed.

How to acquire traffic information about the vicinity of the current position of the car will be further explained by referring to FIG. 25. FIG. 25 is an example of a display screen when traffic information about the vicinity of the current car position.

In response to user's operation of the remote controller 1635 or to user's clicking of a button provided in the periphery of the screen the car terminal 1606 displays a menu similarly to FIG. 22. When now detecting the selection of the 'current position vicinity' submenu 2213, the car terminal 1606 is connected to the navigation server 1602 and put in a traffic information wait state. After the car terminal 1606 is connected to the navigation server 1602, downloads traffic information therefrom, and then completes the downloading of the traffic information; the screen is transited to the screen of FIG. 25 to display the acquired traffic information 2501 and 2502. The traffic information 2501 is now data (not traffic information about the on-route 2202) downloaded as the traffic information about the current car position. The traffic information 2502, on the other hand, is data downloaded as on-route traffic information. If there is an emergency message in the downloaded data, then the car terminal preferentially displays the emergency message, similarly to the case of acquiring the on-route traffic information.

The display of the emergency message is not limited to only when traffic information is downloaded. When the car terminal 1606 accesses the navigation server 1602, the terminal desirably necessarily downloads the emergency message, because the emergency message should be informed to the user as soon as possible, which will be explained by referring to FIG. 27.

Figure 26:
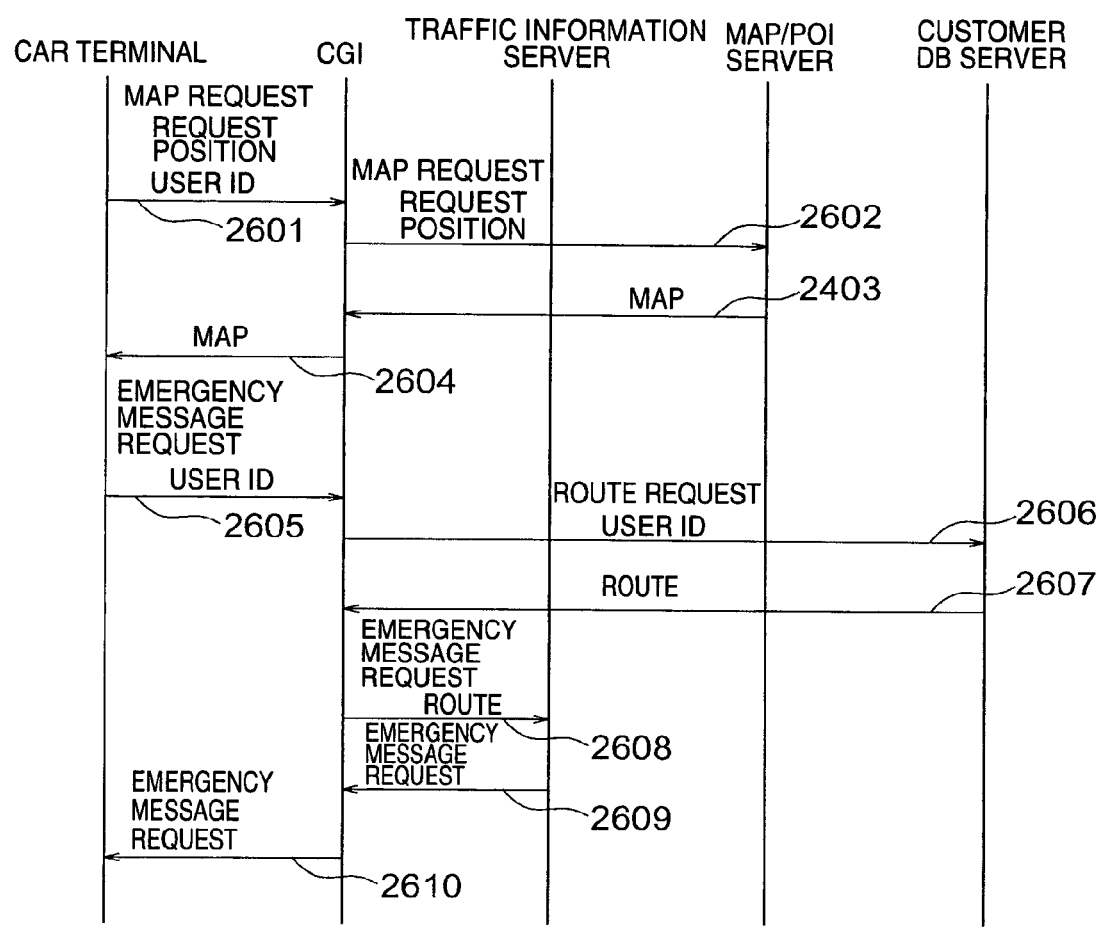
FIG. 26 is a sequence chart when the car terminal 1606 requests the navigation server 1602 to issue map information to the car terminal.

FIG. 26 is a sequence after the car terminal 1606 requires the navigation server 1602 to transmit map information to the terminal until the terminal downloads an emergency message on a route. The car terminal 1606 issues a request for map information to the navigation server 1602 (2601), and the request is accepted by the CGI 1701. The CGI 1701 requires the map/POI server 1704 to send a map of a site specified by the car terminal 1606 thereto (2602), and accepts the map information of the specified request position therefrom (2603). When accepting the map, the CGI 1701 transmits the map information to the car terminal 1606 (2604).

After acquiring the desired most preferentially, the car terminal 1606 issues a request having an emergency message information user ID attached thereto to the navigation server 1602 (2605). How to acquire an emergency message on a route has substantially the same sequence as how to acquire on-route traffic information. More specifically, the CGI 1701 requires the customer DB server 1705 to send route information with use of a user ID specified (2606), and acquires the route information of the corresponding user (2607). Next, the CGI 1701 transmits the accepted route information to the traffic information server 1702 (2608), the traffic information server 1702 in turn searches for an emergency message, and the CGI 1701 receives the searched result from the traffic information server (2609) and transmits it to the car terminal 1606 (2610).

If the car terminal 1606 has route link information relating to its own guide route, then the terminal may upload the link information to the navigation server 1602 in such a manner that the navigation server searches for an on-route emergency message with use of the link information as a key. When the car terminal 1606 requires an emergency message, the car terminal can inform the navigation server 1602 of the range on the route so far explained above. In other words, the terminal can download only an emergency message present in the range.

Although the most preferentially and the emergency message are separately requested and received in the present embodiment, these may be simultaneously requested and received together. That is, when accepting a map information request, the navigation server 1602 may not transmit only the map information first to the car terminal 1606, but may search for an emergency message on the route and transmit the emergency message to the car terminal 1606 together with the map information. This is not limited to when the map information is required, and can be implemented even when information such as POI other than the map is requested.

The above will be further explained by referring to a screen example. The car terminal 1606 displays the main menu 2211 similar to FIG. 22 according to user's operation of the remote controller 1635 or user's clicking of a button provided in the periphery of the display screen. When the user selects the map acquisition menu 2215, a target point vicinity menu for acquiring a map in the vicinity of a target point and a current point vicinity menu for acquiring a map in the vicinity of the current point further appear. And when the user selects the target point vicinity menu from the map acquisition menu 2215, that is, when the user instructs the car terminal 1606 to acquire the map in the vicinity of the target point, the car terminal is connected to the navigation server 1602. After the car terminal 1606 is successfully connected to the navigation server 1602, the terminal transmits a map request to the CGI to acquire map information. Next, the car terminal requests the navigation server 1602 to send an on-route emergency message. In the presence of such an emergency message, the car terminal downloads it.

Figure 27:
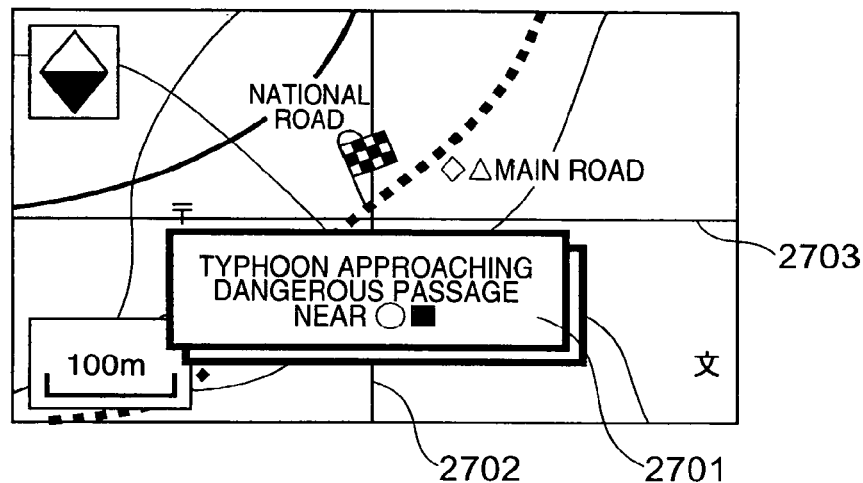
FIG. 27 shows a screen on which an emergency message is displayed.

After all information have been downloaded, the map information and the emergency message are displayed, which is shown in a display screen of FIG. 27. In FIG. 27, an emergency message 2701 is displayed, and a map in the vicinity of the specified target position is also displayed. Center lines 2702 and 1703 are plotted when the displayed map is a site other than the current position. The map is displayed so that an intersection point between the center lines corresponds to the target position, and a mark indicative of the target position is also plotted.

In FIG. 27, the emergency message 2701 and map information are displayed simultaneously. However, it is also possible to display the emergency message 2701 first and then to display the map information in the vicinity of the target position. With this screen, however, the user accessed the navigation server 1602 for the purpose of acquiring the map information. Thus, when the user preferentially displays information other than user's target position, it is desirable to display the effect on the screen of the car terminal 1606.

When the user operates the remote controller 1635 or clicks the confirm button in the periphery of the screen during display of the screen of FIG. 27, the emergency message 2701 disappears and the screen display is transited to a screen showing a map in the vicinity of the target point. In the absence of the emergency message, no emergency message cannot be displayed and therefore the screen is transited directly to a screen showing the map in the vicinity of the target point.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A traffic information providing system for creating statistical traffic information, comprising:
    storage mage for storing the traffic information including information about a travel time of each of link making up a road on a map, wherein said traffic information being externally acquired by the traffic information acquiring means;
    link travel time probability calculating means for calculating a probability distribution of travel times of the links for each time zone with use of past traffic information stored by the storage means every time zone in which the statistical traffic information is created;
    route travel-time probability calculating means for calculating a probability distribution of travel times of a specific route making up a plurality of links with use of the probability distribution calculated by the link travel-time probability calculating means;
    setting means for setting a travel time range or a travel time probability for the specific route; and
    reliability calculating means, when the travel time range of the specific route is set by the setting means, for calculating a probability that the travel time of the specific route is in the travel time range set by the setting means with use of the probability distribution of travel times of the specific route and, when the travel time probability of the specific route is set by the setting means, for calculating a travel time range in which the travel time probability set by the setting means with use of the probability distribution of travel times of the specific route.

2. The A traffic information providing system for creating traffic information to be used in a car navigation system, comprising:
    travel information acquiring means for externally acquiring traffic information including information about a travel time of each of links making up a road on a map;
    storage means for storing the traffic information acquired by the traffic information acquiring means;
    link travel-time probability calculating means for calculating a probability distribution of travel times of the links with use of a past traffic information stored by the storage means;
    route travel-time probability calculating means for calculating a probability distribution of travel times of a specific route making up a plurality of links with use of the probability distribution calculated by the link travel-time probability calculating means;
    setting means for setting a travel time range or a travel time probability for the specific route; and
    when the travel time range of the specific route is set by the setting means, reliability calculating means for calculating a probability that the travel time of the specific route is in the travel time range set by the setting means with use of the probability distribution of travel times of the specific route and, when the travel time probability of the specific route is set by the setting means, for calculating a travel time range in which the travel time of the specific route falls in the travel time probability set by the setting means with use of the probability distribution of travel times of the specific route.

* * * * *